(12) United States Patent
Kitano et al.

(10) Patent No.: US 11,407,475 B2
(45) Date of Patent: Aug. 9, 2022

(54) BICYCLE DERAILLEUR

(71) Applicant: SHIMANO INC., Sakai (JP)

(72) Inventors: Hiroyuki Kitano, Sakai (JP); Yu Goto, Sakai (JP); Takeshi Ueda, Sakai (JP)

(73) Assignee: SHIMANO INC., Sakai (JP)

( * ) Notice: Subject to any disclaimer, the term of this patent is extended or adjusted under 35 U.S.C. 154(b) by 387 days.

(21) Appl. No.: 16/705,478

(22) Filed: Dec. 6, 2019

(65) Prior Publication Data

US 2021/0171156 A1  Jun. 10, 2021

(51) Int. Cl.
*B62M 9/122* (2010.01)
*B62M 25/08* (2006.01)

(52) U.S. Cl.
CPC ............ *B62M 9/122* (2013.01); *B62M 25/08* (2013.01)

(58) Field of Classification Search
CPC ....... B62M 25/08; B62M 9/122; B62M 9/132
USPC ...................................................... 474/80, 82
See application file for complete search history.

(56) References Cited

U.S. PATENT DOCUMENTS

| | | | | |
|---|---|---|---|---|
| 3,638,952 | A * | 2/1972 | Ban .......................... | G11B 15/44 360/137 |
| 7,553,247 | B2 * | 6/2009 | Guderzo ................ | B62M 9/122 474/70 |
| 7,779,724 | B2 * | 8/2010 | Fujii ...................... | B62M 25/08 340/432 |
| 8,825,322 | B1 * | 9/2014 | Ikemoto ................ | B62M 25/08 280/282 |
| 8,944,945 | B2 * | 2/2015 | Kilshaw .................. | B62J 13/00 474/78 |
| 8,979,683 | B2 * | 3/2015 | Katsura .................. | B62M 25/08 474/82 |
| 8,998,756 | B2 * | 4/2015 | Ichida .................... | B62K 23/06 474/81 |
| 9,008,923 | B2 * | 4/2015 | Takamoto .............. | B62M 9/122 474/155 |
| 9,037,368 | B2 * | 5/2015 | Miglioranza ............. | F16H 9/04 701/64 |
| 2004/0138017 | A1 * | 7/2004 | Kitamura ................ | G01P 3/487 474/82 |
| 2005/0043129 | A1 * | 2/2005 | Guderzo ................ | B62M 25/08 474/70 |

(Continued)

FOREIGN PATENT DOCUMENTS

JP  2007-084031  4/2007

*Primary Examiner* — Henry Y Liu
(74) *Attorney, Agent, or Firm* — Mori & Ward, LLP

(57) ABSTRACT

A user interface of a bicycle derailleur is configured to receive a user input to execute at least one of: calibration in which a sensor is reset; changing an assist operation of an assist driving unit; changing information displayed in a display; a recovering operation by an actuator of the bicycle derailleur; a reset of a pairing operation; changing a shifting threshold used in an automatic shifting mode; changing a communication channel between a wired communication channel and a wireless communication channel; changing a function assigned to an operating device; a shut-down of a system of the bicycle derailleur; a wake-up operation of the system; a restart of the system; an operation of at least one additional bicycle component; changing a shifting mode between the automatic shifting mode and a manual shifting mode; and changing the shifting operation between a synchronized shifting mode and a non-synchronized shifting mode.

16 Claims, 14 Drawing Sheets

(56) References Cited

U.S. PATENT DOCUMENTS

| | | | |
|---|---|---|---|
| 2007/0068332 A1* | 3/2007 | Fujii | B62J 50/22 |
| | | | 74/551.8 |
| 2014/0087901 A1* | 3/2014 | Shipman | B62M 9/122 |
| | | | 429/100 |
| 2014/0162817 A1* | 6/2014 | Yamaguchi | B62M 9/122 |
| | | | 474/80 |
| 2015/0203169 A1* | 7/2015 | Nishino | F16H 59/04 |
| | | | 74/491 |
| 2018/0229803 A1* | 8/2018 | Wesling | B62M 25/08 |
| 2018/0257736 A1* | 9/2018 | Komatsu | B62J 45/41 |
| 2018/0257737 A1* | 9/2018 | Komatsu | B62M 9/122 |
| 2019/0009852 A1* | 1/2019 | Shirai | B62J 1/08 |
| 2019/0031287 A1* | 1/2019 | Ueda | B62M 9/132 |
| 2019/0144071 A1* | 5/2019 | Boehm | B62M 9/1242 |
| | | | 474/80 |
| 2019/0144072 A1* | 5/2019 | Su | B62M 9/127 |
| | | | 474/82 |
| 2019/0315435 A1* | 10/2019 | Jordan | B62L 3/02 |
| 2019/0359069 A1* | 11/2019 | Usui | B62J 50/00 |
| 2020/0223513 A1* | 7/2020 | Ho | B62J 45/20 |
| 2020/0231249 A1* | 7/2020 | Ho | B62M 25/04 |
| 2020/0247504 A1* | 8/2020 | Ho | B62M 9/122 |

\* cited by examiner

|     |      |      | FS      |       |
| --- | ---  | ---  | ---     | ---   |
|     |      |      | 28      | 38    |
|     |      |      | LOW     | TOP   |
| RS  | 45   | 1st  | 0.62    | 0.84  |
|     | 40   | 2nd  | 0.70    | 0.95  |
|     | 36   | 3rd  | 0.78    | 1.06  |
|     | 32   | 4th  | 0.88    | 1.19  |
|     | 28   | 5th  | 1.00    | 1.36  |
|     | 24   | 6th  | 1.17    | 1.58  |
|     | 21   | 7th  | 1.33    | 1.81  |
|     | 18   | 8th  | 1.56    | 2.11  |
|     | 16   | 9th  | 1.75    | 2.38  |
|     | 14   | 10th | 2.00    | 2.71  |
|     | 12   | 11th | 2.33    | 3.17  |
|     | 10   | 12th | 2.80    | 3.80  |

BICYCLE DERAILLEUR

BACKGROUND OF THE INVENTION

Field of the Invention

The present invention relates to a bicycle derailleur.

Discussion of the Background

A bicycle includes a derailleur configured to move a chain relative to a plurality of sprockets.

SUMMARY OF THE INVENTION

In accordance with a first aspect of the present invention, a bicycle derailleur comprises a base member, a movable member, a linkage structure, and a user interface. The base member is configured to be attached to a bicycle frame. The movable member is configured to be movable relative to the base member. The linkage structure is configured to movably couple the movable member to the base member. The user interface is configured to receive a user input to execute at least one of: calibration in which a sensor is reset; changing an assist operation of an assist driving unit; changing information displayed in a display; a recovering operation by an actuator of the bicycle derailleur; a reset of a pairing operation between the bicycle derailleur and another component; changing a shifting threshold used in an automatic shifting mode; changing a communication channel through which the bicycle derailleur communicates with another component between a wired communication channel and a wireless communication channel; changing a function assigned to an operating device separately provided from the bicycle derailleur; a shut-down of a system of the bicycle derailleur; a wake-up operation of the system of the bicycle derailleur; a restart of the system of the bicycle derailleur; an operation of at least one additional bicycle component of a plurality of additional bicycle components; changing a shifting mode between the automatic shifting mode and a manual shifting mode; and changing the shifting operation between a synchronized shifting mode and a non-synchronized shifting mode.

With the bicycle derailleur according to the first aspect, it is possible to improve usability of a bicycle.

In accordance with a second aspect of the present invention, the bicycle derailleur according to the first aspect is configured so that the user interface includes a switch other than a push switch.

With the bicycle derailleur according to the second aspect, it is possible to improve usability of the bicycle with a simple structure.

In accordance with a third aspect of the present invention, the bicycle derailleur according to the first or second aspect is configured so that the user interface includes a switch having a first switch status and a second switch status that is different from the first switch status. The bicycle derailleur has a first derailleur status and a second derailleur status that is different from the first derailleur status. The bicycle derailleur is in the first derailleur status while the switch is in the first switch status. The bicycle derailleur is in the second derailleur status while the switch is in the second switch status.

With the bicycle derailleur according to the third aspect, it is possible to further improve usability of the bicycle.

In accordance with a fourth aspect of the present invention, the bicycle derailleur according to any one of the first to third aspects is configured so that the user interface includes a switch having a first switch status and a second switch status that is different from the first switch status. The at least one additional bicycle component of the plurality of additional bicycle components has a first component status and a second component status that is different from the first component status. The at least one additional bicycle component of the plurality of additional bicycle components is in the first component status while the switch is in the first switch status. The at least one additional bicycle component of the plurality of additional bicycle components is in the second component status while the switch is in the second switch status.

With the bicycle derailleur according to the fourth aspect, it is possible to further improve usability of the bicycle.

In accordance with a fifth aspect of the present invention, the bicycle derailleur according to any one of the first to fourth aspects is configured so that the user interface includes at least one of a dial switch, a tactile switch, a slide switch, a capacitive switch, and a toggle switch.

With the bicycle derailleur according to the fifth aspect, it is possible to improve usability of the bicycle with a simple structure.

In accordance with a sixth aspect of the present invention, the bicycle derailleur according to any one of the first to fifth aspects is configured so that the base member has a rear-sprocket facing surface and a reverse surface provided on a reverse side of the rear-sprocket facing side. The rear-sprocket facing side is configured to face toward a bicycle rear sprocket assembly in a mounting state where the base member is attached to the bicycle frame. The user interface is provided in the reverse surface.

With the bicycle derailleur according to the sixth aspect, it is possible to further improve usability of the bicycle.

In accordance with a seventh aspect of the present invention, the bicycle derailleur according to the sixth aspect is configured so that the reverse surface is inclined relative to an upper direction in the mounting state where the base member is attached to the bicycle frame.

With the bicycle derailleur according to the seventh aspect, it is possible to further improve usability of the bicycle.

In accordance with an eighth aspect of the present invention, the bicycle derailleur according to any one of the first to seventh aspects further comprises an information device configured to inform a user of a state of the bicycle derailleur.

With the bicycle derailleur according to the eighth aspect, it is possible to further improve usability of the bicycle.

In accordance with a ninth aspect of the present invention, the bicycle derailleur according to the eighth aspect is configured so that the information device is mounted to at least one of the base member, the movable member, and the linkage structure.

With the bicycle derailleur according to the ninth aspect, it is possible to improve design flexibility of the bicycle derailleur with improving usability of the bicycle.

In accordance with a tenth aspect of the present invention, the bicycle derailleur according to the eighth or ninth aspect is configured so that the base member has a rear-sprocket facing surface and a reverse surface provided on a reverse side of the rear-sprocket facing side. The rear-sprocket facing side is configured to face toward a bicycle rear sprocket assembly in a mounting state where the base member is attached to the bicycle frame. The information device is provided in the rear-sprocket facing surface.

With the bicycle derailleur according to the tenth aspect, it is possible to further improve usability of the bicycle.

In accordance with an eleventh aspect of the present invention, the bicycle derailleur according to any one of the eighth to tenth aspects is configured so that the information device includes an indicator configured to indicate the state of the bicycle derailleur.

With the bicycle derailleur according to the eleventh aspect, it is possible to further improve usability of the bicycle with a simple structure.

In accordance with a twelfth aspect of the present invention, the bicycle derailleur according to the eleventh aspect is configured so that the indicator includes a light emitter configured to emit light in accordance with the state of the bicycle derailleur.

With the bicycle derailleur according to the twelfth aspect, it is possible to further improve usability of the bicycle with a simple structure.

In accordance with a thirteenth aspect of the present invention, the bicycle derailleur according to any one of the eighth to twelfth aspects is configured so that the information device is configured to inform the user of a state of a battery charge.

With the bicycle derailleur according to the thirteenth aspect, it is possible to further improve usability of the bicycle.

In accordance with a fourteenth aspect of the present invention, the bicycle derailleur according to any one of the first to thirteenth aspects is configured so that the at least one additional bicycle component of the plurality of additional bicycle components includes at least one of a bicycle suspension and a bicycle adjustable seatpost.

With the bicycle derailleur according to the fourteenth aspect, it is possible to further improve usability of the bicycle.

In accordance with a fifteenth aspect of the present invention, a bicycle derailleur comprises a base member, a movable member, a linkage structure, and a user interface. The base member is configured to be attached to a bicycle frame. The movable member is configured to be movable relative to the base member. The linkage structure is configured to movably couple the movable member to the base member. The user interface includes an electric switch other than a push switch.

With the bicycle derailleur according to the fifteenth aspect, it is possible to improve usability of the bicycle.

In accordance with a sixteenth aspect of the present invention, a bicycle derailleur comprises a base member, a movable member, a linkage structure, and a user interface. The base member is configured to be attached to a bicycle frame. The base member includes a first base surface and a second base surface. The first base surface faces in an upper direction in the mounting state where the base member is attached to the bicycle frame. The second base surface is provided on a reverse side of the first base surface. The movable member is configured to be movable relative to the base member. The linkage structure is configured to movably couple the movable member to the base member. The user interface is configured to receive a user input and provided in the second base surface.

With the bicycle derailleur according to the sixteenth aspect, it is possible to improve usability of the bicycle.

In accordance with a seventeenth aspect of the present invention, a bicycle derailleur comprises a base member, a movable member, a linkage structure, at least one of a user interface and an information device, and a pulley axis. The base member is configured to be attached to a bicycle frame. The movable member is configured to be movable relative to the base member. The linkage structure is configured to movably couple the movable member to the base member. The linkage structure includes at least one linkage axis. The at least one of the user interface and the information device is mounted to at least one of the base member and the linkage structure. The pulley axis extends along an axial direction parallel to a sprocket rotational axis of a bicycle sprocket assembly in a mounting state where the bicycle derailleur and the bicycle sprocket assembly are mounted to a bicycle frame. The at least one linkage axis of the linkage structure is oriented orthogonally to the axial direction.

With the bicycle derailleur according to the seventeenth aspect, it is possible to improve usability of the bicycle.

In accordance with an eighteenth aspect of the present invention, a bicycle derailleur comprises a base member, a movable member, a linkage structure, a chain guide, and at least one of a user interface and an information device. The base member is configured to be attached to a bicycle frame. The movable member is configured to be movable relative to the base member. The linkage structure is configured to movably couple the movable member to the base member. The chain guide is pivotally disposed on the movable member. The chain guide includes a guide pulley and a tension pulley. The guide pulley is rotatable relative to the movable member about a guide pulley axis. The tension pulley is rotatable relative to the movable member about a tension pulley axis. The at least one of the user interface and the information device is mounted to at least one of the base member, the movable member, and the linkage structure. The chain guide is pivotable relative to the movable member about a chain-guide axis. The guide pulley axis and the tension pulley axis are spaced apart from each other. The tension pulley axis and the chain-guide axis are spaced apart from each other. A first reference line is defined to extend from the guide pulley to the chain-guide axis. A second reference line is defined to extend from the guide pulley axis to the tension pulley axis. An angle defined by the first reference line and the second reference line ranges from 20 degrees to 170 degrees.

With the bicycle derailleur according to the eighteenth aspect, it is possible to improve usability of the bicycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 is a shift schedule of the bicycle illustrated in FIG. 1.

DESCRIPTION OF THE EMBODIMENTS

Figure 1:
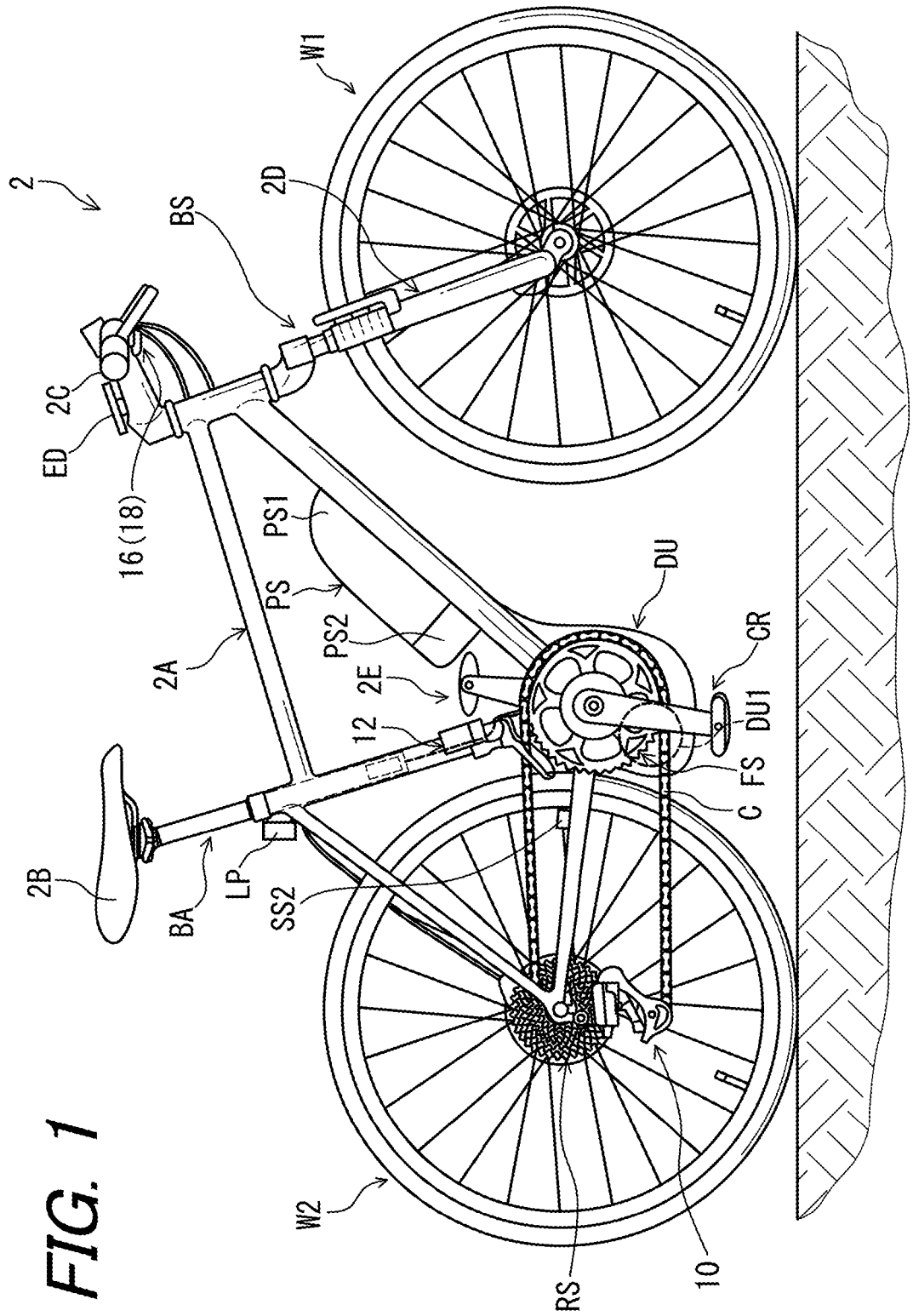
FIG. 1 is a side elevational view of a bicycle including a bicycle derailleur in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 2 includes a bicycle derailleur 10 in accordance with a first embodiment. While the bicycle 2 is illustrated as a mountain bike, the bicycle derailleur 10 can be applied to a road bike, a city bike, a tricycle, a cargo bike, a recumbent bike, or any type of bicycles.

The bicycle 2 further includes a bicycle frame 2A, a saddle 2B, a handlebar 2C, a front fork 2D, a drive train 2E, a front wheel W1, and a rear wheel W2. The front fork 2D is rotatably mounted to the bicycle frame 2A. The handlebar 2C is secured to the front fork 2D. The front wheel W1 is rotatably coupled to the front fork 2D. The rear wheel W2 is rotatably coupled to the bicycle frame 2A.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the bicycle 2 with facing the handlebar 2C. Accordingly, these terms, as utilized to describe the bicycle derailleur 10 or other components, should be interpreted relative to the bicycle 2 equipped with the bicycle derailleur 10 as used in an upright riding position on a horizontal surface.

The drive train 2E includes the bicycle derailleur 10, an additional bicycle derailleur 12, a crank CR, a bicycle front sprocket assembly FS, a bicycle rear sprocket assembly RS, and a chain C The bicycle front sprocket assembly FS is coupled to the crank CR to rotate relative to the bicycle frame 2A along with the crank CR. The bicycle rear sprocket assembly RS is rotatably mounted to the bicycle frame 2A. The chain C is engaged with the bicycle front sprocket assembly FS and the bicycle rear sprocket assembly RS. The bicycle derailleur 10 is mounted to the bicycle frame 2A and is configured to shift the chain C relative to the bicycle rear sprocket assembly RS to change a gear position. The additional bicycle derailleur 12 is mounted to the bicycle frame 2A and is configured to shift the chain C relative to the bicycle front sprocket assembly FS to change a gear position. However, the additional bicycle derailleur 12 can be omitted from the drive train 2E if needed and/or desired.

The bicycle 2 includes a bicycle suspension BS and a bicycle adjustable seatpost BA. The bicycle suspension BS is provided in a headtube of the bicycle frame 2A. The bicycle suspension BS is configured to absorb shock transmitted from a road surface to the front fork 2D. The bicycle suspension BS includes a suspension actuator configured to change damper property and/or a stroke in response to a suspension input. The bicycle adjustable seatpost BA is configured to change a position of the saddle 2B in response to a seatpost input. The bicycle adjustable seatpost BA includes a seatpost actuator configured to change a state of the bicycle adjustable seatpost BA between a locked state and an adjustable state. An interface configured to receive the suspension input and the seatpost input can be provided to another device such as the operating device 16 or 18 or the bicycle derailleur 10. Each of the bicycle suspension BS and the bicycle adjustable seatpost BA includes structures which has been known in the bicycle field. Thus, they will not be described in detail here for the sake of brevity.

Figure 2:
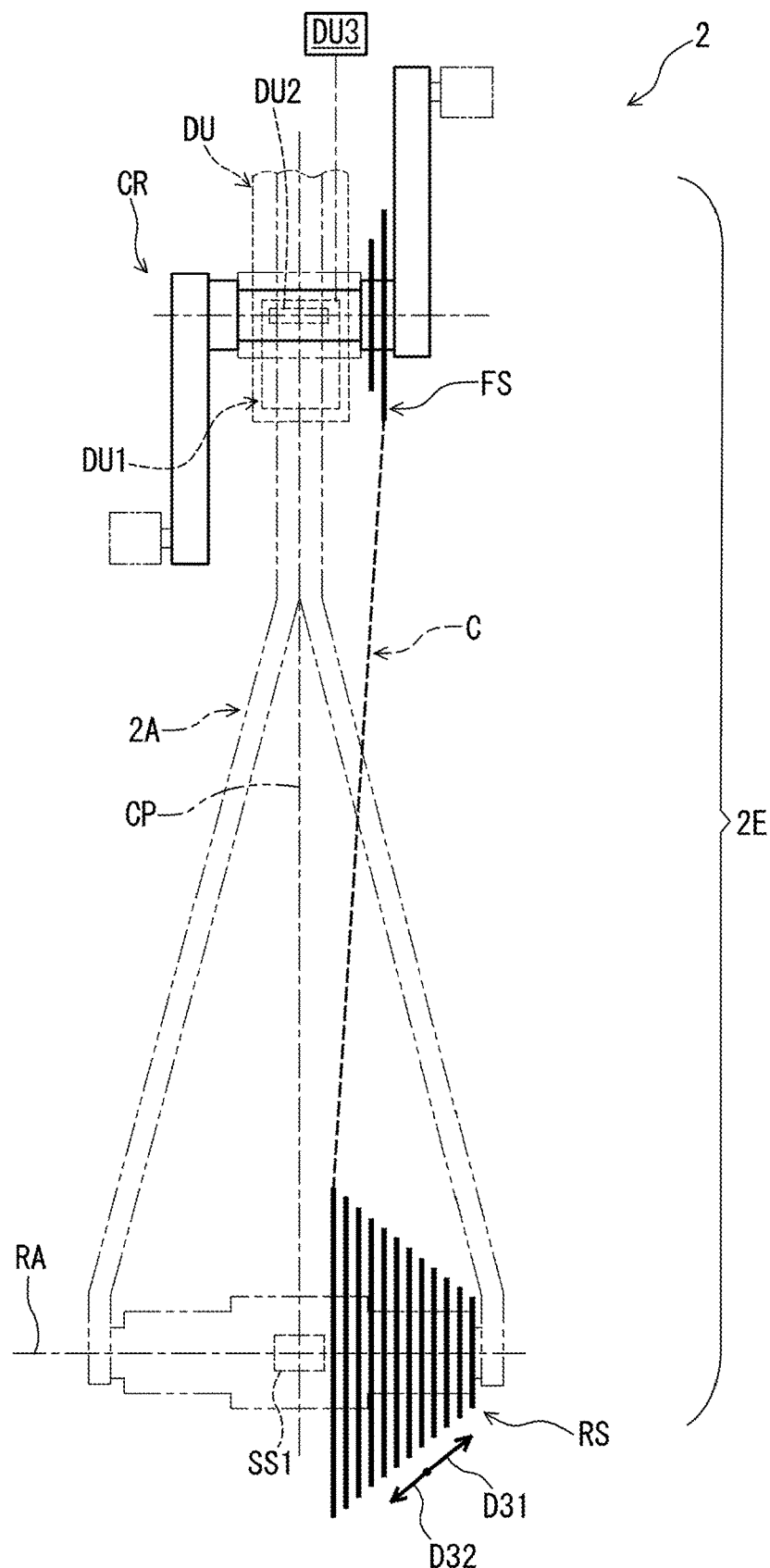
FIG. 2 is a schematic diagram of the bicycle illustrated in FIG. 1.

As seen in FIG. 2, the bicycle 2 includes an assist driving unit DU configured to assist pedaling. The assist driving unit DU includes an assist motor DU1 and a pedaling-force sensor DU2. The assist motor DU1 is configured to apply an assist driving force to the drive train 2E. The pedaling-force sensor DU2 is configured to sense a pedaling force applied to the crank CR from a rider. The assist driving unit DU includes a motor controller DU3 configured to control the assist motor DU1 to add the assist driving force to the drive train 2E based on an assist ratio and the pedaling force sensed by the pedaling-force sensor DU2. The motor controller DU3 is configured to select and/or calculate the assist ratio. However, the motor controller DU3 can be configured to control the assist motor DU1 to add the assist driving force to the drive train 2E regardless of the assist ratio and/or the pedaling force. For example, the motor controller DU3 can be configured to control the assist motor DU1 to add the assist driving force to the crank CR based on a user input received by an operating device.

The assist driving unit DU has at least two assist modes having different assist ratios. In this embodiment, the assist driving unit DU has a first assist mode and a second assist mode. The first assist mode has a first assist ratio. The second assist mode has a second assist ratio which is lower than the first assist ratio. In the first assist mode, the motor controller DU3 is configured to calculate the assist driving force based on the first assist ratio and the pedaling force sensed by the pedaling-force sensor DU2. In the second assist mode, the motor controller DU3 is configured to calculate the assist driving force based on the second assist ratio and the pedaling force sensed by the pedaling-force sensor DU2. The operating device 16 includes an assist mode switch SW13 configured to receive an assist-mode input U13. For example, the motor controller DU3 is configured to change the assist mode between the first assist mode and the second assist mode in response to the assist-mode input U13 received by the assist mode switch SW13. For example, the assist mode switch SW13 has two positions respectively corresponding to the first assist mode and the second assist mode.

The bicycle 2 includes a lamp LP configured to emit light. The lamp LP has a plurality of illumination levels and a plurality of illumination patterns. The lamp LP includes a lamp switch configured to receive an illumination-level user input and an illumination-pattern user input. The lamp LP is configured to change the illumination level in response to an illumination-level user input and configured to change the illumination pattern in response to an illumination-pattern user input. In this embodiment, the lamp LP is a tale lamp. However, the lamp LP can be a head lamp.

As seen in FIG. 1, the bicycle 2 includes a power supply PS. The power supply PS is configured to supply electricity to the bicycle derailleur 10, the additional bicycle derailleur 12, the assist driving unit DU, the bicycle suspension BS, and the bicycle adjustable seatpost BA. The power supply PS includes a battery PS1 and a battery holder PS2. The battery holder PS2 is secured to the bicycle frame 2A. The battery PS1 is detachably attached to the battery holder PS2.

Figure 3:
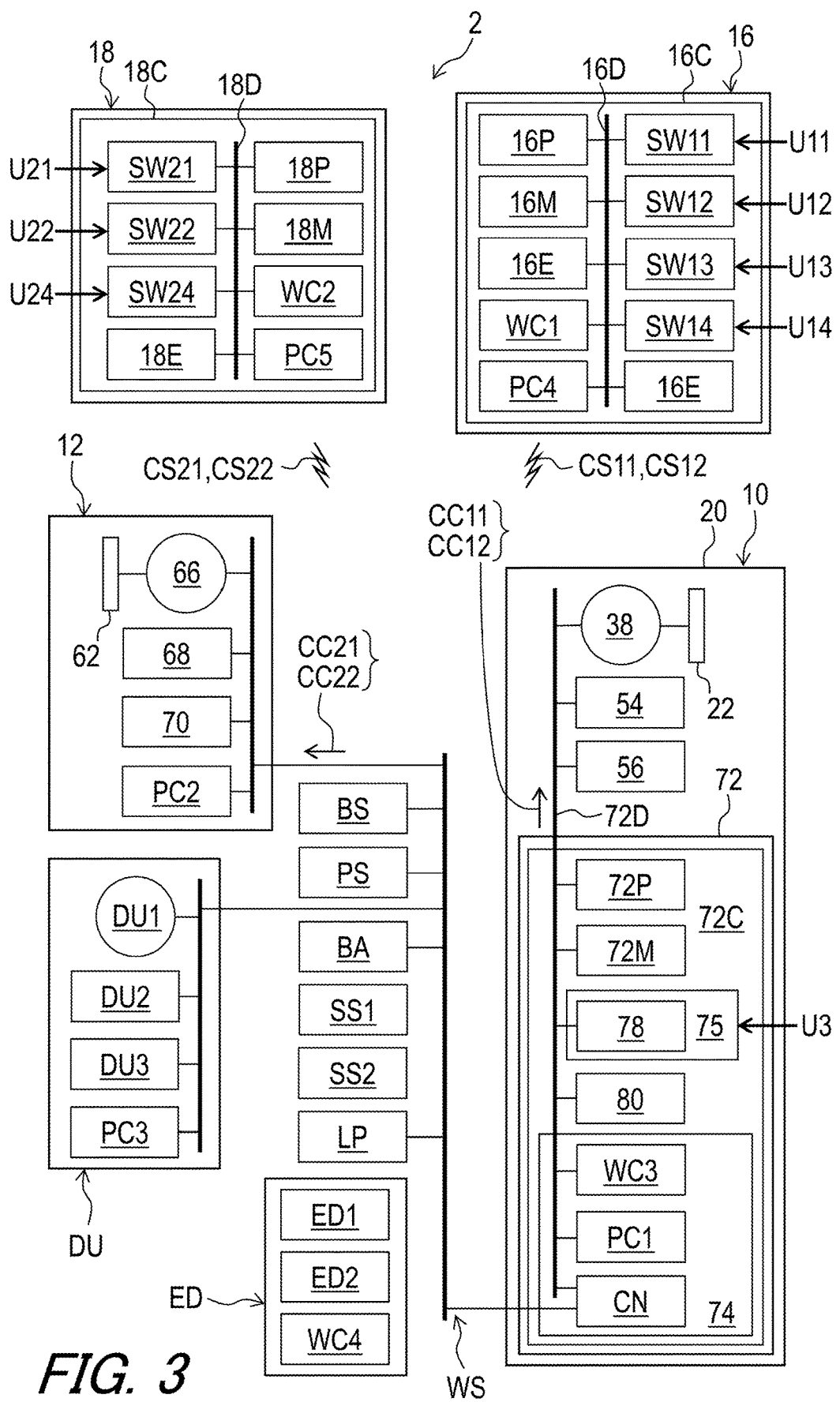
FIG. 3 is a schematic block diagram of the bicycle illustrated in FIG. 1 (wireless communication).

As seen in FIG. 3, the bicycle 2 includes a wired communication structure WS. The power supply PS is electrically connected to the bicycle derailleur 10, the additional bicycle derailleur 12, the assist driving unit DU, the bicycle suspension BS, the bicycle adjustable seatpost BA, and the lamp LP with the wired communication structure WS to supply electricity to the bicycle derailleur 10, the additional bicycle derailleur 12, the assist driving unit DU, the bicycle suspension BS, the bicycle adjustable seatpost BA, and the lamp LP. For example, the wired communication structure WS includes at least one electric cable. However, the bicycle derailleur 10 can be electrically connected to another power supply which is separately provided from the power supply PS. For example, the bicycle derailleur 10 can be electrically connected to a power supply provided inside the bicycle frame 2A or directly attached to the bicycle derailleur 10.

The bicycle 2 comprises an operating device 16 and an operating device 18. The operating device 18 is a separate device from the operating device 16. The operating device 16 is mounted to a right part of the handlebar 2C. The operating device 18 is mounted to a left part of the handlebar 2C. However, the positions of the operating device 16 and the operating device 18 are not limited to this embodiment. The operating device 18 can be integrally provided with the operating device 16 as a single device.

The operating device 16 is configured to receive a first user input U11 and a first additional user input U12. The operating device 16 is configured to output a first control signal CS11 in response to the first user input U11. The operating device 16 is configured to output a first additional control signal CS12 in response to the first additional user input U12.

The operating device 16 includes a first electrical switch SW11 and a first additional electrical switch SW12. The first electrical switch SW11 is configured to receive the first user input U11. The first additional electrical switch SW12 is configured to receive the first additional user input U12.

The operating device 18 is configured to receive a second user input U21 and a second additional user input U22. The operating device 18 is configured to output a second control signal CS21 in response to the second user input U21. The operating device 18 is configured to output a second additional control signal CS22 in response to the second additional user input U22.

The operating device 18 includes a second electrical switch SW21 and a second additional electrical switch SW22. The second electrical switch SW21 is configured to receive the second user input U21. The second additional electrical switch SW22 is configured to receive the second additional user input U22.

In this embodiment, the first user input U11 and the first control signal CS11 indicate upshifting of the bicycle derailleur 10. The first additional user input U12 and the first additional control signal CS12 indicate downshifting of the bicycle derailleur 10. The second user input U21 and the second control signal CS21 indicate upshifting of the additional bicycle derailleur 12. The second additional user input U22 and the second additional control signal CS22 indicate downshifting of the additional bicycle derailleur 12.

As seen in FIG. 2, upshifting occurs the chain C is shifted from a sprocket to a neighboring smaller sprocket in an upshifting direction D31 in the bicycle rear sprocket assembly RS. Downshifting occurs the chain C is shifted from a sprocket to a neighboring larger sprocket in a downshifting direction D32 in the bicycle rear sprocket assembly RS.

Figure 4:
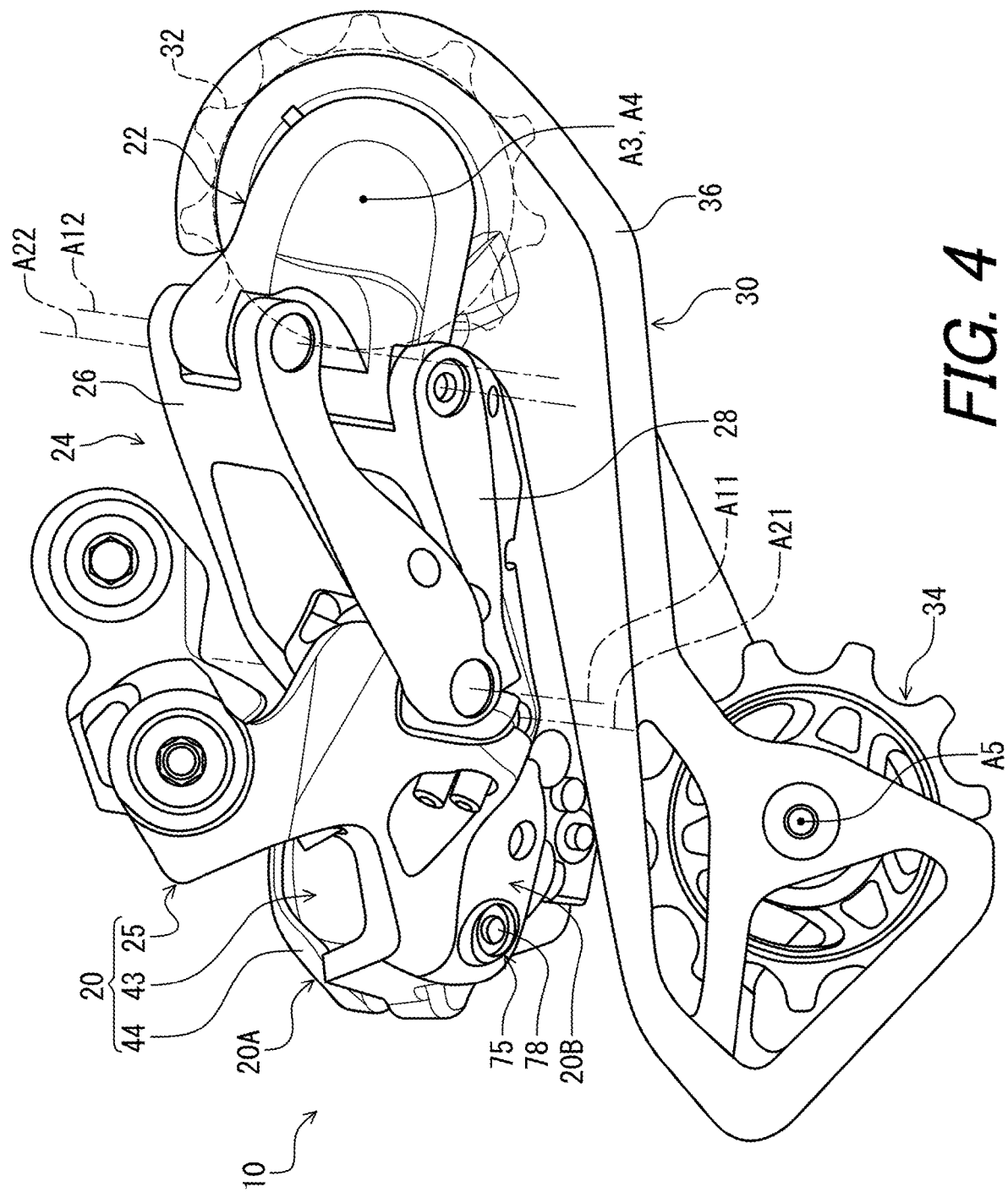
FIG. 4 is a side elevational view of the bicycle derailleur of the bicycle illustrated in FIG. 1.

As seen in FIG. 4, the bicycle derailleur 10 comprises a base member 20, a movable member 22, and a linkage structure 24. The base member 20 is configured to be attached to the bicycle frame 2A (see, e.g., FIG. 1). The movable member 22 is configured to be movable relative to the base member 20. The linkage structure 24 is configured to movably couple the movable member 22 to the base member 20. The linkage structure 24 includes at least one linkage axis.

In this embodiment, the base member 20 includes a base body 25 configured to be attached to the bicycle frame 2A (see, e.g., FIG. 1). The linkage structure 24 is configured to movably couple the movable member 22 to the base body 25 of the base member 20. The linkage structure 24 includes a first link 26 and a second link 28. The first link 26 is pivotally coupled to the base body 25 of the base member 20 about a first linkage axis A11. The second link 28 is pivotally coupled to the base body 25 of the base member 20 about a second linkage axis A21. The first link 26 is pivotally coupled to the movable member 22 about a first additional linkage axis A12. The second link 28 is pivotally coupled to the movable member 22 about a second additional linkage axis A22.

The bicycle derailleur 10 comprises a chain guide 30. The chain guide 30 is pivotally disposed on the movable member 22. The chain guide 30 is pivotable relative to the movable member 22 about a chain-guide axis A3. The chain guide 30 includes a guide pulley 32 and a tension pulley 34. The guide pulley 32 is rotatable relative to the movable member 22 about a guide pulley axis A4. The tension pulley 34 is rotatable relative to the movable member 22 about a tension pulley axis A5. The guide pulley axis A4 and the tension pulley axis A5 are spaced apart from each other. The tension pulley axis A5 and the chain-guide axis A3 are spaced apart from each other. The guide pulley axis A4 can also be referred to as a pulley axis A4. The tension pulley axis A5 can also be referred to as a pulley axis A5. The guide pulley axis A4 is coincident with the chain-guide axis A3. However, the positional relationship among the chain-guide axis A3, the guide pulley axis A4, and the tension pulley axis A5 is not limited to this embodiment.

In this embodiment, the chain guide 30 includes a guide member 36. The guide member 36 is pivotally coupled to the movable member 22 about the chain-guide axis A3. The guide pulley 32 is rotatably coupled to the guide member 36 about the guide pulley axis A4. The tension pulley 34 is rotatably coupled to the guide member 36 about the tension pulley axis A5. The guide pulley 32 and the tension pulley 34 are configured to be engaged with the chain C.

Figure 5:
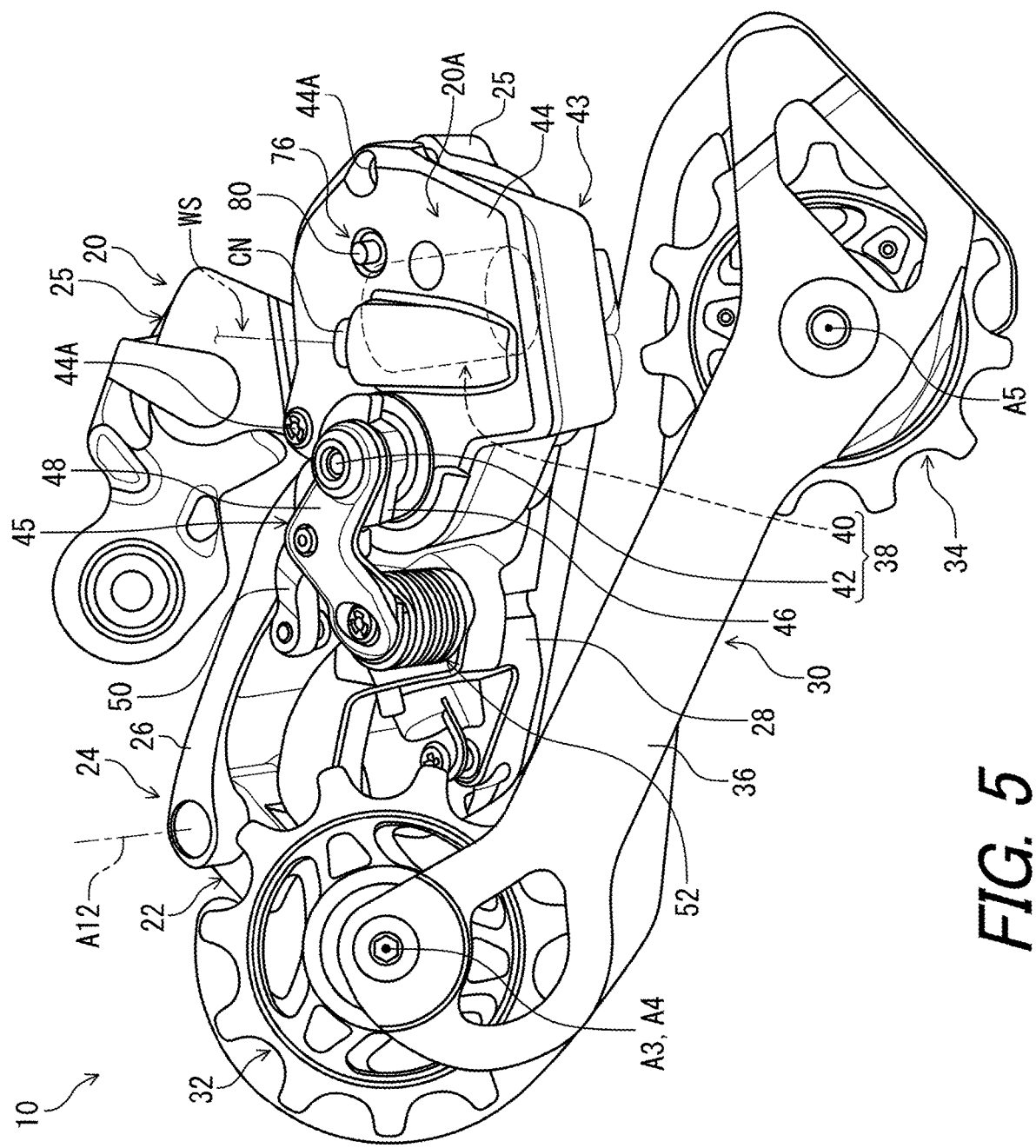
FIG. 5 is another side elevational view of the bicycle derailleur of the bicycle illustrated in FIG. 1.

As seen in FIG. 5, the bicycle derailleur 10 further comprises an actuator 38. The actuator 38 is configured to be coupled to at least one of the movable member 22 and the linkage structure 24 to move the movable member 22 relative to the base member 20. In this embodiment, the actuator 38 is configured to be coupled to the second link 28 of the linkage structure 24 to move the linkage structure 24 relative to the base member 20. However, the actuator 38 can be configured to be coupled to the movable member 22 or both the movable member 22 and the linkage structure 24 to move the movable member 22 relative to the base member 20.

In this embodiment, the actuator 38 includes a motor unit 40 and an output shaft 42. The output shaft 42 is configured to output a rotation generated by the motor unit 40. The base member 20 includes a housing 43 and a cover 44. The housing 43 is a separate member from the base body 25 and the cover 44. The cover 44 is a separate member from the base body 25. The cover 44 is secured to the base body 25 with fasteners 44A. The cover 44 is secured to the base body 25 to hold the housing 43 between the base body 25 and the cover 44. The housing 43 includes an internal space 43A (see, e.g., FIG. 10). The actuator 38 is partly provided in the internal space 43A of the housing 43.

The bicycle derailleur 10 comprises a saver structure 45 configured to protect the actuator 38 from overload. The actuator 38 is configured to be coupled to the second link 28 of the linkage structure 24 via the saver structure 45.

Figure 6:
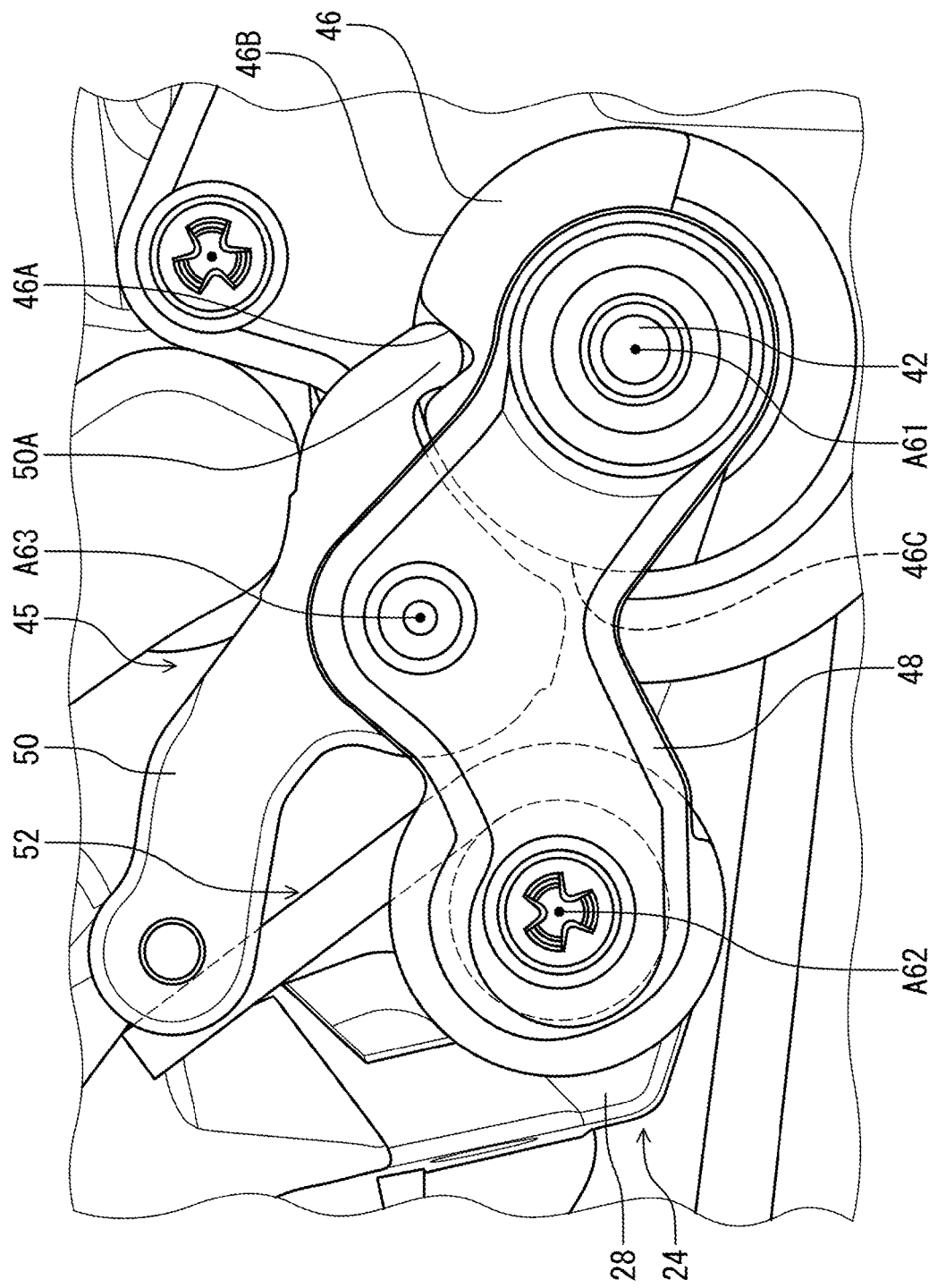
FIG. 6 is a partial side elevational view of the bicycle derailleur illustrated in FIG. 5.

As seen in FIG. 6, the saver structure 45 includes an output member 46, an intermediate link 48, a drive link 50, and a biasing member 52. The output member 46 is secured to the output shaft 42 of the actuator 38 to rotate along with the output shaft 42. The intermediate link 48 is pivotally coupled to the output shaft 42 of the actuator 38 about a first axis A61. The intermediate link 48 is pivotally coupled to the second link 28 of the linkage structure 24 about a second axis A62. The drive link 50 is pivotally coupled to the intermediate link 48 about a third axis A63. The output member 46 is engaged with the drive link 50 to transmit the rotational from the output shaft 42 to the drive link 50. The biasing member 52 is configured to bias the drive link 50 to maintain engagement between the drive link and the output member 46.

The output member 46 includes a notch 46A, a first slidable surface 46B, and a second slidable surface 46C. The notch 46A is provided between the first slidable surface 46B and the second slidable surface 46C. The drive link 50 includes a protrusion 50A configured to be engaged with the output member 46.

The saver structure 45 has a transmission state and a protection state. In the transmission state, the protrusion 50A of the drive link 50 is engaged with the notch 46A of the output member 46 to receive the rotation from the output member 46. Thus, in the transmission state, the saver structure 45 is configured to transmit a drive force of the actuator 38 to the linkage structure 24 via the output member 46, the drive link 50, and the intermediate link 48 to move the movable member 22 with respect to the base member 20.

In the protection state, the protrusion 50A of the drive link 50 is outside the notch 46A and in slidable engagement with one of the first slidable surface 46B and the second slidable surface 46C. Thus, in the protection state, the saver structure 45 is configured to stop the transmission of the drive force of the actuator 38 (see, e.g., FIG. 4) to the linkage structure 24.

The state of the saver structure 45 is automatically changed from the transmission state to the protection state if the movable member 22 cannot move with respect to the base member 20 (e.g. becomes jammed) or if the force to move the movable member 22 with respect to the base member 20 becomes greater than a prescribed operating force. The protrusion 50A of the drive link 50 is automatically disengaged from the notch 46A of the output member 46 while the actuator 38 outputs the drive force from the output shaft 42 to the output member 46 if the movable member 22 cannot move with respect to the base member 20 (e.g. becomes jammed) or if the force necessary to move the movable member 22 with respect to the base member 20 becomes greater than a prescribed operating force. In this way, the actuator 38 is protected by the saver structure 45 in certain situations.

The state of the saver structure 45 is not automatically returned from the protection state to the transmission state. In a recovering operation of the saver structure 45, the state of the saver structure 45 is returned from the protection state to the transmission state when the actuator 38 rotates the output member 46 in an opposite direction to bring the protrusion 50A in engagement with the notch 46A.

As seen in FIG. 3, the bicycle derailleur 10 includes a position sensor 54 and a motor driver 56. The actuator 38 is electrically connected to the position sensor 54 and the motor driver 56. The actuator 38 includes a rotational shaft operatively coupled to the movable member 22. The position sensor 54 is configured to sense a current gear position of the bicycle derailleur 10. Examples of the position sensor 54 include a potentiometer and a rotary encoder. The position sensor 54 is configured to sense an absolute rotational position of the output shaft 42 of the actuator 38 as the current gear position of the bicycle derailleur 10. The motor driver 56 is configured to control the actuator 38 based on the current gear position sensed by the position sensor 54.

Figure 7:
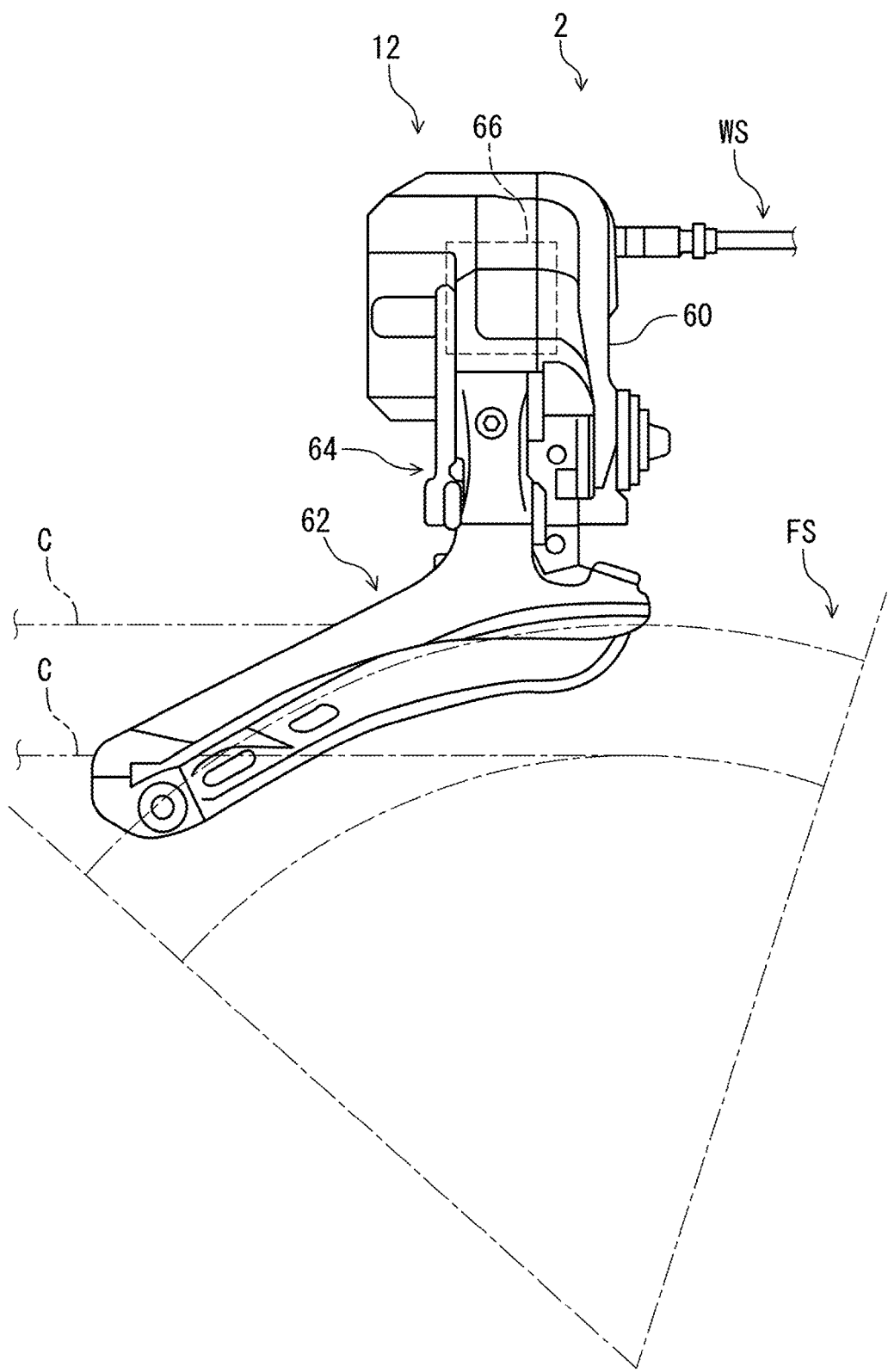
FIG. 7 is a side elevational view of an additional bicycle derailleur of the bicycle illustrated in FIG. 1.

As seen in FIGS. 3 and 7, the bicycle derailleur 10 comprise a base member 60, a movable member 62, a linkage structure 64, an actuator 66, a position sensor 68, and a motor driver 70. The base member 60, the movable member 62, the linkage structure 64, the actuator 66, the position sensor 68, and the motor driver 70 have substantially the same structures as the structures of the base member 20, the movable member 22, the linkage structure 24, the actuator 38, the position sensor 54, and the motor driver 56 of the bicycle derailleur 10. Thus, they will not be described in detail here for sake of brevity.

As seen in FIG. 3, the bicycle derailleur 10 comprises a controller 72 and a communicator 74. In this embodiment, the controller 72 and the communicator 74 are configured to be mounted to the base member 20. However, at least one of the controller 72 can be mounted to another member of the bicycle derailleur 10 or another device such as the operating device 16, the operating device 18, the additional bicycle derailleur 12, the power supply PS, and the wired communication structure WS.

The controller 72 is configured to be electrically connected to the additional bicycle derailleur 12, the assist driving unit DU, the power supply PS, the bicycle suspension BS, the bicycle adjustable seatpost BA, and the lamp LP with the wired communication structure WS. The communicator 74 is configured to be communicate with the operating device 16, the operating device 18, the additional bicycle derailleur 12, the assist driving unit DU, the power supply PS, the bicycle suspension BS, the bicycle adjustable seatpost BA, and the lamp LP. The controller 72 is configured to control the bicycle derailleur 10 based on the first control signal CS11 and the first additional control signal CS12. The controller 72 is configured to control the additional bicycle derailleur 12 based on the second control signal CS21 and the second additional control signal CS22.

In this embodiment, the controller 72 is configured to control the actuator 38 to move the movable member 22 in an upshift direction in response to the first control signal CS11. The controller 72 is configured to control the actuator 38 to move the movable member 22 in a downshift direction in response to the first additional control signal CS12. The controller 72 is configured to control the additional bicycle derailleur 12 to upshift in response to the second control signal CS21. The controller 72 is configured to control the additional bicycle derailleur 12 to downshift in response to the second additional control signal CS22.

The communicator 74 includes a wireless communicator WC3 configured to establish a wireless communication channel. The wireless communicator WC3 is configured to communicate with the operating device 16 and the operating device 18 via the wireless communication channel. The wireless communicator WC3 is configured to wirelessly receive the first control signal CS11, the first additional control signal CS12, the second control signal CS21, and the second additional control signal CS22.

The controller 72 includes a processor 72P, a memory 72M, a circuit board 72C, and a system bus 72D. The processor 72P and the memory 72M are electrically mounted on the circuit board 72C. The processor 72P includes a central processing unit (CPU) and a memory controller. The memory 72M is electrically connected to the processor 72P. The memory 72M includes a read only memory (ROM) and a random-access memory (RAM). The memory 72M includes storage areas each having an address in the ROM and the RAM. The processor 72P is configured to control the memory 72M to store data in the storage areas of the memory 72M and reads data from the storage areas of the memory 72M. The memory 72M (e.g., the ROM) stores a program. The program is read into the processor 72P, and thereby the configuration and/or algorithm of the controller 72 is performed.

The wireless communicator WC3 is electrically mounted on the circuit board 72C. The wireless communicator WC3 is electrically connected to the processor 72P and the memory 72M with the circuit board 72C and the system bus 72D. The wireless communicator WC3 includes a signal transmitting circuit, a signal receiving circuit, and an antenna. Thus, the wireless communicator WC3 can also be referred to as a wireless communication circuit WC3.

The wireless communicator WC3 is configured to superimpose digital signals on carrier wave using a predetermined wireless communication protocol to wirelessly transmit a control signal. In this embodiment, the wireless communicator WC3 is configured to encrypt a control signal using a cryptographic key to generate encrypted wireless signals.

The wireless communicator WC3 is configured to receives a wireless signal via the antenna. In this embodiment, the wireless communicator WC3 is configured to decode the wireless signal to recognize the first control signal CS11, the first additional control signal CS12, the second control signal CS21, and/or the second additional control signal CS22 which are wirelessly transmitted from the operating device 16 and/or the operating device 18. The wireless communicator WC3 is configured to decrypt the wireless signal using the cryptographic key.

As seen in FIG. 3, the operating device 16 includes a first wireless communicator WC1 configured to wirelessly transmit the first control signal CS11 and the first additional control signal CS12. The first wireless communicator WC1 is configured to wirelessly receive information. The first wireless communicator WC1 is configured to be electrically connected to the first electrical switch SW11 to transmit the first control signal CS11 in response to the first user input U1f. The first wireless communicator WC1 is configured to be electrically connected to the first additional electrical switch SW12 to transmit the first additional control signal CS12 in response to the first additional user input U12.

The operating device 16 includes a first processor 16P, a first memory 16M, a first circuit board 16C, and a first system bus 16D. The first processor 16P and the first memory 16M are electrically mounted on the first circuit board 16C. The first processor 16P includes a CPU and a memory controller. The first memory 16M is electrically connected to the first processor 16P. The first memory 16M includes a ROM and a RAM. The first memory 16M includes storage areas each having an address in the ROM and the RAM. The first processor 16P is configured to control the first memory 16M to store data in the storage areas of the first memory 16M and reads data from the storage areas of the first memory 16M. The first circuit board 16C, the first electrical switch SW11, and the first additional electrical switch SW12 are electrically connected to the first system bus 16D. The first electrical switch SW11 and the first additional electrical switch SW12 are electrically connected to the first processor 16P and the first memory 16M with the first circuit board 16C and the first system bus 16D. The first memory 16M (e.g., the ROM) stores a program. The program is read into the first processor 16P, and thereby the configuration and/or algorithm of the operating device 16 is performed.

The first wireless communicator WC1 is electrically mounted on the first circuit board 16C. The first wireless communicator WC1 is electrically connected to the first processor 16P and the first memory 16M with the first circuit board 16C and the first system bus 16D. The first wireless communicator WC1 includes a signal transmitting circuit, a signal receiving circuit, and an antenna. Thus, the first wireless communicator WC1 can also be referred to as a first wireless communication circuit WC1.

The first wireless communicator WC1 is configured to superimpose digital signals such as the first control signal CS11 and the first additional control signal CS12 on carrier wave using a predetermined wireless communication protocol to wirelessly transmit the first control signal CS11 and the first additional control signal CS12. In this embodiment, the first wireless communicator WC1 is configured to encrypt a control signal (e.g., the first control signal CS11 or the first additional control signal CS12) using a cryptographic key to generate encrypted wireless signals.

The first wireless communicator WC1 is configured to receives a wireless signal via the antenna. In this embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The operating device 16 includes a first electric power source 16E. The first electric power source 16E is configured to supply electricity to the operating device 16. The first electric power source 16E is configured to be electrically connected to the operating device 16. In this embodiment, the first electric power source 16E includes a first battery and a first battery holder. The first battery includes a replaceable and/or rechargeable battery. The first battery holder is configured to be electrically connected to the operating device 16 via the first circuit board 16C and the first system bus 16D. The first battery is configured to be detachably attached to the first battery holder. However, the first electric power source 16E is not limited to this embodiment. For example, the first electric power source 16E can include another component such as a capacitor and an electricity generation element (e.g., a piezoelectric element) instead of or in addition to the first battery and the first battery holder.

As seen in FIG. 3, the operating device 18 includes a second wireless communicator WC2 configured to wirelessly transmit the second control signal CS21 and the second additional control signal CS22. The second wireless communicator WC2 is configured to wirelessly receive information. The second wireless communicator WC2 is configured to be electrically connected to the second electrical switch SW21 to transmit the second control signal CS21 in response to the second user input U21. The second wireless communicator WC2 is configured to be electrically connected to the second additional electrical switch SW22 to transmit the second additional control signal CS22 in response to the second additional user input U22.

The operating device 18 includes a second processor 18P, a second memory 18M, a second circuit board 18C, and a second system bus 18D. The second processor 18P and the second memory 18M are electrically mounted on the second circuit board 18C. The second processor 18P includes a CPU and a memory controller. The second memory 18M is electrically connected to the second processor 18P. The second memory 18M includes a ROM and a RAM. The second memory 18M includes storage areas each having an address in the ROM and the RAM. The second processor 18P is configured to control the second memory 18M to store data in the storage areas of the second memory 18M and reads data from the storage areas of the second memory 18M. The second circuit board 18C, the second electrical switch SW21, and the second additional electrical switch SW22 are electrically connected to the second system bus 18D. The second electrical switch SW21 and the second additional electrical switch SW22 are electrically connected to the second processor 18P and the second memory 18M with the second circuit board 18C and the second system bus 18D. The second memory 18M (e.g., the ROM) stores a program. The program is read into the second processor 18P, and thereby the configuration and/or algorithm of the operating device 18 is performed.

The second wireless communicator WC2 is electrically mounted on the second circuit board 18C. The second wireless communicator WC2 is electrically connected to the second processor 18P and the second memory 18M with the second circuit board 18C and the second system bus 18D. The second wireless communicator WC2 includes a signal transmitting circuit, a signal receiving circuit, and an antenna. Thus, the second wireless communicator WC2 can also be referred to as a second wireless communication circuit WC2.

The second wireless communicator WC2 is configured to superimpose digital signals such as the second control signal CS21 and the second additional control signal CS22 on carrier wave using a predetermined wireless communication protocol to wirelessly transmit the second control signal CS21 and the second additional control signal CS22. In this embodiment, the second wireless communicator WC2 is configured to encrypt a control signal (e.g., the second control signal CS21 or the second additional control signal CS22) using a cryptographic key to generate encrypted wireless signals.

The second wireless communicator WC2 is configured to receives a wireless signal via the antenna. In this embodiment, the second wireless communicator WC2 is configured to decode the wireless signal to recognize signals and/or information wirelessly transmitted from another wireless communicator. The second wireless communicator WC2 is configured to decrypt the wireless signal using the cryptographic key.

The operating device 18 includes a second electric power source 18E. The second electric power source 18E is configured to supply electricity to the operating device 18. The second electric power source 18E is configured to be electrically connected to the operating device 18. In this embodiment, the second electric power source 18E includes a second battery and a second battery holder. The second battery includes a replaceable and/or rechargeable battery. The second battery holder is configured to be electrically connected to the operating device 18 via the second circuit board 18C and the second system bus 18D. The second battery is configured to be detachably attached to the second battery holder. However, the second electric power source 18E is not limited to this embodiment. For example, the second electric power source 18E can include another component such as a capacitor and an electricity generation element (e.g., a piezoelectric element) instead of or in addition to the second battery and the second battery holder.

Each of the bicycle derailleur 10, the operating device 16, and the operating device 18 has a pairing mode. In the pairing mode, the wireless communicator WC3 and the first wireless communicator WC1 are configured to establish the wireless communication channel between the wireless communicator WC3 and the first wireless communicator WC1. In the pairing mode, the wireless communicator WC3 and the second wireless communicator WC2 are configured to establish the wireless communication channel between the wireless communicator WC3 and the second wireless communicator WC2. Each of the bicycle derailleur 10, the operating device 16, and the operating device 18 is configured to store unique identifying information.

In the pairing mode of the bicycle derailleur 10, the wireless communicator WC3 is configured to transmit identifying information indicating the bicycle derailleur 10 to the first wireless communicator WC1 and/or configured to receive first identifying information indicating the operating device 16. In the pairing mode of the bicycle derailleur 10, the wireless communicator WC3 is configured to transmit the identifying information indicating the bicycle derailleur 10 to the second wireless communicator WC2 and/or configured to receive second identifying information indicating the operating device 18.

In the pairing mode of the operating device 16, the first wireless communicator WC1 is configured to transmit the first identifying information indicating the operating device 16 to the wireless communicator WC3 and/or configured to receive the identifying information indicating the bicycle derailleur 10. In the pairing mode of the operating device 18, the second wireless communicator WC2 is configured to transmit the second identifying information indicating the operating device 18 to the wireless communicator WC3 and/or configured to receive the identifying information indicating the bicycle derailleur 10.

The wireless communicator WC3 is configured to recognize signals transmitted from the first wireless communicator WC1 based on the identifying information and/or the first identifying information. The wireless communicator WC3 is configured to recognize signals transmitted from the second wireless communicator WC2 based on the identifying information and/or the second identifying information.

The first wireless communicator WC1 is configured to recognize signals transmitted from the wireless communicator WC3 based on the identifying information and/or the first identifying information. The second wireless communicator WC2 is configured to recognize signals transmitted from the wireless communicator WC3 based on the identifying information and/or the second identifying information.

As seen in FIG. 3, the controller 72 is configured to generate a first control command CC11 based on the first control signal CS11. The controller 72 is configured to generate a first additional control command CC12 based on the first additional control signal CS12. The controller 72 is configured to generate a second control command CC21 based on the second control signal CS21. The controller 72 is configured to generate a second additional control command CC22 based on the second additional control signal CS22.

The first control signal CS11, the first additional control signal CS12, the second control signal CS21, and the second additional control signal CS22 are distinguishable from each other. The first control command CC11, the first additional control command CC12, the second control command CC21, and the second additional control command CC22 are distinguishable from each other.

In this embodiment, the first control signal CS11 and the first control command CC11 indicate upshifting of the bicycle derailleur 10. The first additional control signal CS12 and the first additional control command CC12 indicate downshifting of the bicycle derailleur 10. The second control signal CS21 and the second control command CC21 indicate upshifting of the additional bicycle derailleur 12. The second additional control signal CS22 and the second additional control command CC22 indicate downshifting of the additional bicycle derailleur 12.

As seen in FIG. 3, the motor driver 56 is configured to control the actuator 38 based on the first control command CC11 and the first additional control command CC12 generated by the controller 72. The motor driver 56 is configured to control the actuator 38 to move the movable member 22 relative to the base member 20 by one gear position in an upshift direction based on the first control command CC11 and the current gear position sensed by the position sensor 54. The motor driver 56 is configured to control the actuator 38 to move the movable member 22 relative to the base member 20 by one gear position in a downshift direction based on the first additional control command CC12 and the current gear position sensed by the position sensor 54.

The motor driver 70 is configured to control the actuator 66 based on the second control command CC21 and the second additional control command CC22 generated by the controller 72. The motor driver 70 is configured to control the actuator 66 to move the movable member 62 relative to the base member 60 by one gear position in an upshift direction based on the second control command CC21 and the current gear position sensed by the position sensor 68. The motor driver 70 is configured to control the actuator 66 to move the movable member 62 relative to the base member 60 by one gear position in a downshift direction based on the second additional control command CC22 and the current gear position sensed by the position sensor 68.

As seen in FIG. 3, the controller 72, the additional bicycle derailleur 12, the power supply PS, and the assist driving unit DU communicate with each other via the wired communication structure WS using power line communication (PLC) technology. More specifically, each of the electric cables of the wired communication structure WS includes a ground line and a voltage line that are detachably connected to a serial bus that is formed by communication interfaces. In this embodiment, the controller 72, the additional bicycle derailleur 12, the power supply PS, and the assist driving unit DU can all communicate with each other through the voltage line using the PLC technology.

As seen in FIG. 3, the second control command CC21 and the second additional control command CC22 are transmitted from the controller 72 to the additional bicycle derailleur 12 through the wired communication structure WS. However, the additional bicycle derailleur 12 can include a wireless communicator configured to wirelessly receive the second control signal CS21 and the second additional control signal CS22. In such embodiment, the power supply PS and the wired communication structure WS can be omitted from the bicycle 2. Instead, each of the bicycle derailleur 10 and the additional bicycle derailleur 12 can include a battery.

The PLC technology is used for communicating between electric components. The PLC carries data on a conductor that is also used simultaneously for electric power transmission or electric power distribution to the electric components. In this embodiment, electricity is supplied from the power supply PS to the bicycle derailleur 10, the additional bicycle derailleur 12, and the assist driving unit DU via the wired communication structure WS. Furthermore, the controller 72 can receive information signals from the bicycle derailleur 10, the additional bicycle derailleur 12, the assist driving unit DU, and the power supply PS through the wired communication structure WS using the PLC.

The PLC uses unique identifying information such as a unique identifier that is assigned to each of the bicycle derailleur 10, the additional bicycle derailleur 12, the assist driving unit DU, and the power supply PS. Each of the bicycle derailleur 10, the additional bicycle derailleur 12, the assist driving unit DU, and the power supply PS is configured to store the identifying information. Based on the identifying information, each of the bicycle derailleur 10, the additional bicycle derailleur 12, the assist driving unit DU, and the power supply PS is configured to recognize, based on the identifying information, information signals which are necessary for itself among information signals transmitted via the wired communication structure WS. For example, the controller 72 is configured to recognize information signals transmitted from the bicycle derailleur 10, the additional bicycle derailleur 12, the assist driving unit DU, and the power supply PS with the wired communication structure WS. Instead of using the PLC technology, however, separate signal wires can be provided for transmitting data in addition to the ground wire and the voltage wire if needed and/or desired.

The communicator 74 includes a wired communicator PC1 configured to establish a wired communication channel such as the PLC. The wired communicator PC1 is electrically mounted on the circuit board 72C. The wired communicator PC1 is connected to the wired communication structure WS, the bicycle derailleur 10, and the system bus 72D. The wired communicator PC1 is configured to separate input signals to a power source voltage and control signals. The wired communicator PC1 is configured to regulate the power source voltage to a level at which the controller 72 and the bicycle derailleur 10 can properly operate. The wired communicator PC1 is further configured to superimpose output signals such as the second control command CC21 and the second additional control command CC22 on the power source voltage applied to the wired communication structure WS from the power supply PS.

The additional bicycle derailleur 12 includes a wired communicator PC2. The power supply PS includes a wired communicator PC3. The operating device 16 includes a wired communicator PC4. The operating device 18 includes a wired communicator PC5. The wired communicators PC1, PC2, PC3, PC4, and PC5 are configured to communicate with each other using the PLC. The wired communicators PC2, PC3, PC4, and PC5 have substantially the same structure as the structure of the wired communicator PC1. Thus, they will not be described in detail here for the sake of brevity.

The bicycle derailleur 10 includes a cable connector CN to which an electric cable of the wired communication structure WS is detachably connected. The cable connector CN is configured to be electrically connected to the controller 72 and the wired communicator PC1. As seen in FIG. 5, in this embodiment, the cable connector CN is provided to the base member 20. Specifically, the cable connector CN is provided in the first base surface 20A. However, the cable connector CN can be provided to another member such as the movable member 22 and the linkage structure 24.

The controller 72 is configured to detect that an electric cable is connected to the connector CN. For example, the controller 72 is configured to automatically execute the pairing operation of the wireless communicator WC3 in response to the connection between the electric cable and the connector CN if the wireless communicator WC3 has not been paired with another wireless communicator. The controller 72 can be configured to execute the pairing operation in response to anther input.

As seen in FIG. 3, the operating device 16 is configured to select the first wireless communicator WC1 if the wired communicator PC4 is not electrically connected to the wired communication structure WS. The operating device 18 is configured to select the second wireless communicator WC2 if the wired communicator PC5 is not electrically connected to the wired communication structure WS.

The controller 72 is configured to select the wireless communicator WC3 if the controller 72 wirelessly receives the control signal CS11 and/or CS12 from the operating device 16. The controller 72 is configured to select the wireless communicator WC3 if the controller 72 wirelessly receives the control signal CS21 and/or CS22 from the operating device 18.

Figure 8:
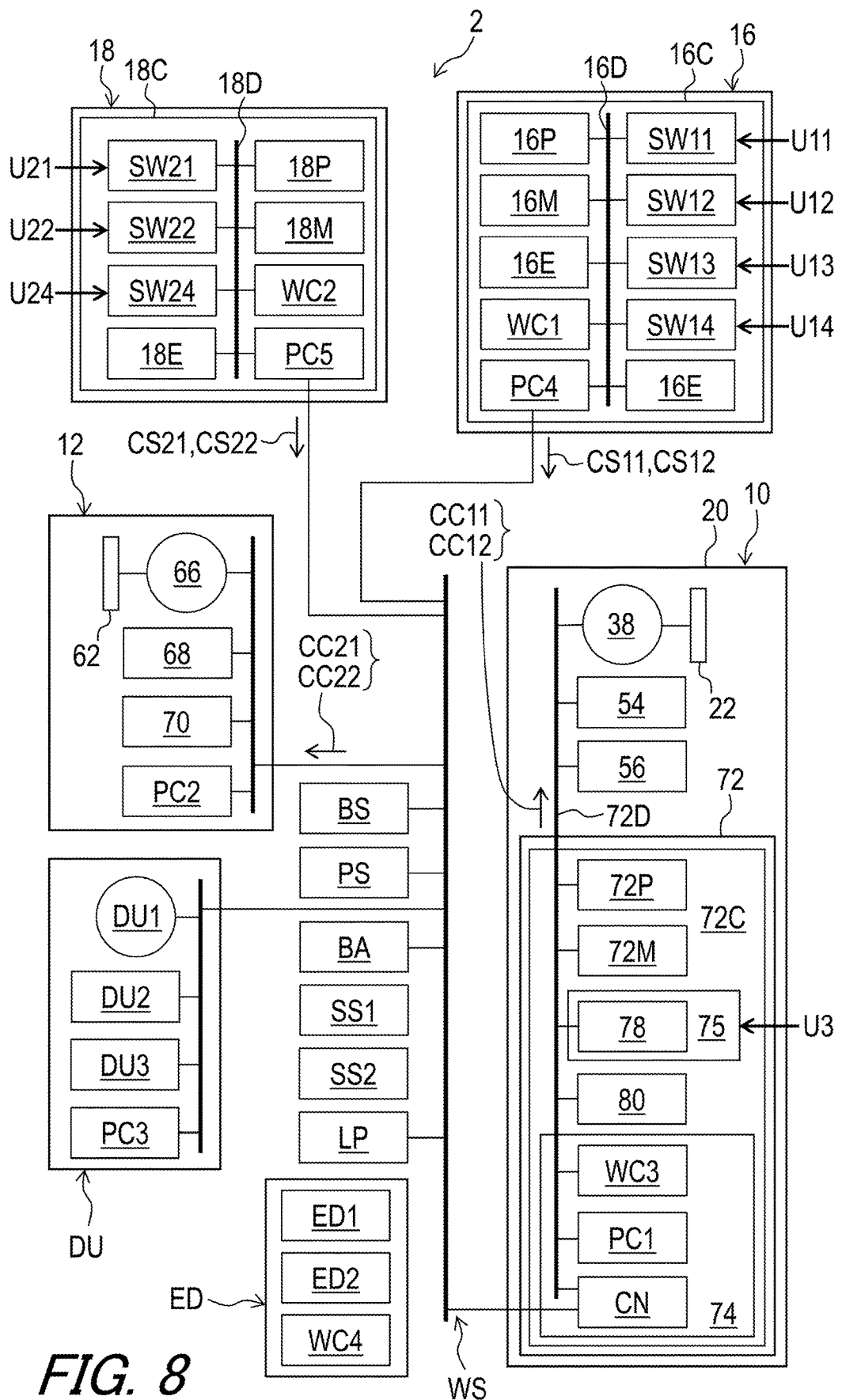
FIG. 8 is a schematic block diagram of the bicycle illustrated in FIG. 1 (wired communication).

As seen in FIG. 8, the controller 72 is configured to communicate with the operating devices 16 and 18 using the wired communicator PC1 through the wired communication structure WS if the wired communicators PC4 and PC5 of the operating devices 16 and 18 are electrically connected to the wired communication structure WS. The operating device 16 is configured to select the wired communicator PC4 if the wired communicator PC4 is electrically connected to the wired communication structure WS. The operating device 18 is configured to select the wired communicator PC5 if the wired communicator PC5 is electrically connected to the wired communication structure WS.

The controller 72 is configured to select the wired communicator PC1 if the controller 72 receives the control signal CS11 and/or CS12 from the operating device 16 via the wired communication structure WS. The controller 72 is configured to select the wired communicator PC1 if the controller 72 receives the control signal CS21 and/or CS22 from the operating device 18 via the wired communication structure WS. The controller 72 can be configured to change the communication channel between the wired communication channel and the wireless communication channel in response to another input.

As seen in FIG. 3, the bicycle 2 includes a sensor SS1. In this embodiment, the sensor SS1 is configured to sense a posture of the bicycle 2 relative to a direction of gravitational force. The sensor SS1 includes an acceleration sensor configured to sense an inclined angle of the bicycle 2 relative to the direction of gravitational force. The inclined angle sensed by the sensor SS1 indicates an inclined angle of a road surface on which the bicycle 2 runs. The sensor SS1 is configured to be calibrated (e.g., rest) to execute zero adjustment of the sensor SS1 based on a posture of the sensor SS1 of when the sensor SS1 is calibrated. In this embodiment, as seen in FIG. 2, the sensor SS1 is mounted to a bicycle hub assembly H configured to rotatably support the bicycle rear sprocket assembly RS. However, the position and/or function of the sensor SS1 is not limited to this embodiment. The sensor SS1 is configured to wirelessly communicate with the wireless communicator WC3 of the bicycle derailleur 10. However, the sensor SS1 can be configured to be electrically connected to the bicycle derailleur 10 via the wired communication structure WS.

The bicycle 2 includes a cadence sensor SS2. The cadence sensor SS2 is configured to sense a cadence of the bicycle 2. The cadence sensor SS2 is configured to sense a rotational speed of the crank CR. The controller 72 is configured to obtain the cadence sensed by the cadence sensor SS2. In this embodiment, as seen in FIG. 1, the cadence sensor SS2 is mounted to the bicycle frame 2A. However, the position of the cadence sensor SS2 is not limited to this embodiment. For example, the cadence sensor SS2 can be provided at any one of a crank shaft of the crank CR, a crank arm of the crank CR, a pedal attached to the crank CR. The cadence sensor SS2 is configured to wirelessly communicate with the controller 72 of the bicycle derailleur 10. However, the cadence sensor SS2 can be configured to be electrically connected to the bicycle derailleur 10 via the wired communication structure WS.

The controller 72 has a manual shifting mode and an automatic shifting mode.

In the manual shifting mode, the controller 72 is configured to control the bicycle derailleur 10 and the additional bicycle derailleur 12 based on the control signals CS11, CS12, CS21, and CS22 transmitted from the operating device 16 and the operating device 18. In the automatic shifting mode, the controller 72 is configured to control the bicycle derailleur 10 and the additional bicycle derailleur 12 based on an automatic gear shift schedule R1 (FIG. 9), the inclined angle sensed by the sensor SS1, and the cadence sensed by the cadence sensor SS2 without using the control signals transmitted from the operating device 16 and the operating device 18. In the automatic shifting mode, the controller 72 is configured to automatically maintain the cadence of the crank CR within a preferable cadence range based on the automatic gear shift schedule R1 (FIG. 9), the inclined angle sensed by the sensor SS1, and the cadence sensed by the cadence sensor SS2 without using the control signals transmitted from the operating device 16 and the operating device 18. The controller 72 is configured to store the preferable cadence range in the memory 72M. The preferable cadence range has an upper shifting threshold and a lower shifting threshold and is defined from the upper shifting threshold to the lower shifting threshold. The upper shifting threshold and the lower shifting threshold can also be referred to as the shifting threshold and the shifting threshold.

In the automatic shifting mode, the controller 72 is configured to execute upshifting of the bicycle derailleur 10 if the cadence sensed by the cadence sensor SS2 is higher than the upper shifting threshold for a determination time. The controller 72 is configured to execute downshifting of the bicycle derailleur 10 if the cadence sensed by the cadence sensor SS2 is lower than the lower shifting threshold for the determination time. The controller 72 is configured to store the determination time in the memory 72M. Each of the upper shifting threshold and the lower shifting threshold can also be referred as a shifting threshold.

In the automatic shifting mode, the controller 72 is configured to change the upper shifting threshold and the lower shifting threshold based on the inclined angle sensed by the sensor SS1. For example, the controller 72 is configured to increase each of the upper shifting threshold and the lower shifting threshold by a first predetermined percentage if the inclined angle sensed by the sensor SS1 is larger than an upper inclination threshold. The controller 72 is configured to decrease each of the upper shifting threshold and the lower shifting threshold by a second predetermined percentage if the inclined angle sensed by the sensor SS1 is larger than a lower inclination threshold. The controller 72 is configured to store the first predetermined percentage, the second predetermined percentage, the upper inclination threshold, and the lower inclination threshold in the memory 72M.

The controller 72 has a synchronized shifting mode and a non-synchronized shifting mode. The manual shifting mode includes the synchronized shifting mode and the non-synchronized shifting mode. In the synchronized shifting mode, the controller 72 is configured to control the bicycle derailleur 10 and the additional bicycle derailleur 12 based on a synchronized gear shift schedule R2 (FIG. 9) and the control signals transmitted from the operating device 16 without using the control signals transmitted from the operating device 18. The controller 72 is configured to store the synchronized gear shift schedule R2 of the synchronized shifting mode in the memory 72M. In the non-synchronized shifting mode, the controller 72 is configured to control the bicycle derailleur 10 based on the control signals transmitted from the operating device 16 and is configured to control the additional bicycle derailleur 12 based on the control signals transmitted from the operating device 18.

As seen in FIG. 9, the bicycle derailleur 10 has first to twelfth gear stages. The additional bicycle derailleur 12 has low and top gear stages. The drive train 2E has 24 gear stages. The automatic gear shift schedule R1 has 14 gear stages among the 24 gear stages. The synchronized gear shift schedule R2 uses 14 gear stages among the 24 gear stages. In this embodiment, the automatic gear shift schedule R1 is the same as the synchronized gear shift schedule R2. However, the automatic gear shift schedule R1 can be different from the synchronized gear shift schedule R2.

In this embodiment, each of the automatic gear shift schedule R1 and the synchronized gear shift schedule R2 is used for both upshifting and downshifting. However, the controller 72 is configured to use an automatic gear upshift schedule for upshifting and an automatic gear downshift schedule route, which is different from the automatic gear upshift schedule, for downshifting. The controller 72 is configured to use a synchronized gear upshift schedule for upshifting and a synchronized gear downshift schedule route, which is different from the synchronized gear upshift schedule, for downshifting.

As seen in FIG. 3, the operating device 16 includes a shifting-mode operation switch SW14 configured to receive a shifting-mode input U14. The controller 72 is configured to change the shifting mode between the manual shifting mode and the automatic shifting mode in response to the shifting-mode input U14 received by the shifting-mode operation switch SW14.

The operating device 18 includes an additional shifting-mode switch SW24 configured to receive an additional shifting-mode input U24. In the manual shifting mode, the controller 72 is configured to change the shifting mode between the synchronized shifting mode and the non-synchronized shifting mode in response to the additional shifting-mode input U24 received by the additional shifting-mode switch SW24.

The controller 72 is configured to execute a shut-down of the system of the bicycle derailleur 10 in response to a shut-down user input. The shut-down includes a normal shut-down and a forced shut-down. When the controller 72 executes the normal shut-down of the system of the bicycle derailleur 10, the controller 72 executes a shut-down process and is shut the power off. In the normal shut-down, the controller 72 stores the late-minute setting of the bicycle derailleur 10 in the memory 72M before the controller 72 is shut the power off. An interface configured to receive the shut-down user input can be provided to another device such as the operating device 16 or 18 or the bicycle derailleur 10.

In case of a system error of the bicycle derailleur 10, for example, the controller 72 cannot execute the normal shut-down. Instead, the controller 72 is configured to execute the forced shut-down. As with the normal shut-down, when the controller 72 executes the forced shut-down of the system of the bicycle derailleur 10, the controller 72 is shut the power off without executing the shut-down process. Thus, in the forced shut-down, the controller 72 does not store the late-minute setting of the bicycle derailleur 10 in the memory 72M.

The controller 72 is configured to execute a wake-up operation of the system of the bicycle derailleur 10 in a sleep mode. The controller 72 has an awake mode and a sleep mode. Power consumption of the controller 72 in the sleep mode is lower than power consumption of the controller 72 in the awake mode. In the awake mode, the controller 72 is configured to execute a normal control of the bicycle derailleur 10. In the sleep mode, the controller 72 is configured to maintain its minimum function to respond signals such as the first and second control signals. The controller 72 is configured to execute the wake-up operation to change the mode of the controller 72 from the sleep mode to the awake mode in response to a wake-up user input or physical change (e.g., vibration) in the bicycle 2. The controller 72 is configured to execute the wake-up operation to change the mode of the controller 72 from the awake mode to the sleep mode if the controller 72 does not detect the wake-up user input or physical change (e.g., vibration) in the bicycle 2 in the awake mode for a predetermined period of time. An interface configured to receive the wake-up user input can be provided to another device such as the operating device 16 or 18 or the bicycle derailleur 10.

The controller 72 is configured to execute a restart of the system of the bicycle derailleur 10. The restart of the system includes the normal shut-down and a start of the system following the normal shut-down. Thus, in the restart of the system, the controller 72 is configured to execute the normal shut-down and the start of the system of the bicycle derailleur 10 in response to a restart user input. An interface configured to receive the restart user input can be provided to another device such as the operating device 16 or 18 or the bicycle derailleur 10.

The bicycle 2 includes an electric device ED. Examples of the electric device ED include a smart device. Examples of the smart device include a cycle computer, a smartphone, a tablet computer, and a smart watch. The electric device ED includes a display ED1, a display operation switch ED2, and an additional wireless communicator WC4. The additional wireless communicator WC4 is configured to wirelessly communicate with the wireless communicator WC3 of the bicycle derailleur 10. The display ED1 is configured to display information relating to the bicycle 2. For example, the display ED1 is configured to display information relating to the shifting mode of the bicycle 2, the rear gear position of the bicycle derailleur 10, the front gear position of the additional bicycle derailleur 12, and the cadence sensed by the cadence sensor SS2. The display ED1 has a plurality of display modes having different layouts and/or different display items. The electric device ED is configured to change the display mode of the display ED1 among the plurality of display modes in response to the operation of the display operation switch ED2. Namely, the electric device ED is configured to change the information displayed on the display ED1 in response to the operation of the display operation switch ED2.

As seen in FIGS. 4 and 5, the bicycle derailleur 10 comprises at least one of a user interface 75 and an information device 76. In this embodiment, as seen in FIG. 4, the bicycle derailleur 10 comprises the user interface 75. The user interface 75 is configured to receive a user input. As seen in FIG. 5, the bicycle derailleur 10 further comprises the information device 76. The information device 76 is configured to inform a user of a state of the bicycle derailleur 10. However, at least one of the user interface 75 and the information device 76 can be omitted from the bicycle derailleur 10.

As seen in FIGS. 4 and 5, the at least one of the user interface 75 and the information device 76 is mounted to at least one of the base member 20 and the linkage structure 24. At least one of the user interface 75 and the information device 76 is mounted to at least one of the base member 20, the movable member 22, and the linkage structure 24. The user interface 75 is mounted to at least one of the base member 20, the movable member 22, and the linkage structure 24. The information device 76 is mounted to at least one of the base member 20, the movable member 22, and the linkage structure 24. In this embodiment, the user interface 75 and the information device 76 are mounted to the base member 20. Specifically, the user interface 75 and the information device 76 are mounted to the housing 43 of the base member 20. However, at least one of the user interface 75 and the information device 76 can be mounted to at least one the base member 20, the movable member 22, and the linkage structure 24.

As seen in FIG. 4, the user interface 75 includes a switch 78 other than a push switch. The switch 78 is configured to be activated in response to the user input. Thus, the switch 78 includes an electric switch 78E. Namely, the user interface 75 includes the electric switch 78E other than a push switch. The user interface 75 includes at least one of a dial switch, a tactile switch, a slide switch, a capacitive switch, and a toggle switch. In this embodiment, the user interface 75 includes a tactile switch configured to be activated in response to the user input. However, the user interface 75 can include another switch or interface instead of or in addition to the tactile switch.

For example, the dial switch includes a dial and a switch element configured to detect rotational positions of the dial. The dial is configured to be operated by a user and is provided rotatably relative to a base such as the housing 43. The tactile switch includes a mounting base, a button, a movable contact, and a fixed contact. The tactile switch is configured to close and/or open an electrical contact in response to a user's operation of the button. The slide switch includes a slide member and a switch element configured to detect linear positions of the slide member. The slide member is movable relative to a base such as the housing 43. The capacitive switch is configured to sense change in electrostatic capacitance between a metallic member of the capacitive switch and a part of a user's body such as a hand. The toggle switch includes a lever and a switch element configured to close and/or open in response to positions of the lever. The push switch is configured to close and/or open an electrical contact when a button of the push switch is pressed. The push switch includes the tactile switch.

As seen in FIG. 3, the user interface 75 is configured to be electrically connected to the controller 72. The switch 78 of the user interface 75 is configured to be electrically connected to the controller 72. The controller 72 is configured to detect whether the switch 78 is operated by the user. The controller 72 is configured to determine a single click of the switch 78, a double click of the switch 78, and a long press of the switch 78. The controller 72 can be configured to determine a variety of different operations of the user interface 75 in accordance with the type of the switch 78.

As seen in FIG. 5, the information device 76 includes an indicator 80 configured to indicate the state of the bicycle derailleur 10. The indicator 80 includes a light emitter 80A configured to emit light in accordance with the state of the bicycle derailleur 10. The light emitter 80A is electrically mounted on the circuit board 72C of the controller 72. The indicator 80 includes a light guide member 80B configured to guide light emitted from the light emitter. The light guide member 80B is made of a transparent material. The circuit board 72C and the light emitter 80A are provided in the internal space 43A of the housing 43. The circuit board 72C is secured to the housing 43.

The information device 76 is configured to inform the user of a state of a battery charge. The information device 76 is configured to inform the user of the remaining level of the battery PS1 of the power supply PS. However, the information device 76 can be configured to indicate other states of the bicycle derailleur 10. For example, the information device 76 can be configured to inform the user of a state of a battery charge of a battery mounted to the bicycle derailleur 10. The battery of the bicycle derailleur 10 is a separate power supply from the power supply PS and is attached to the base member 20.

Figure 10:
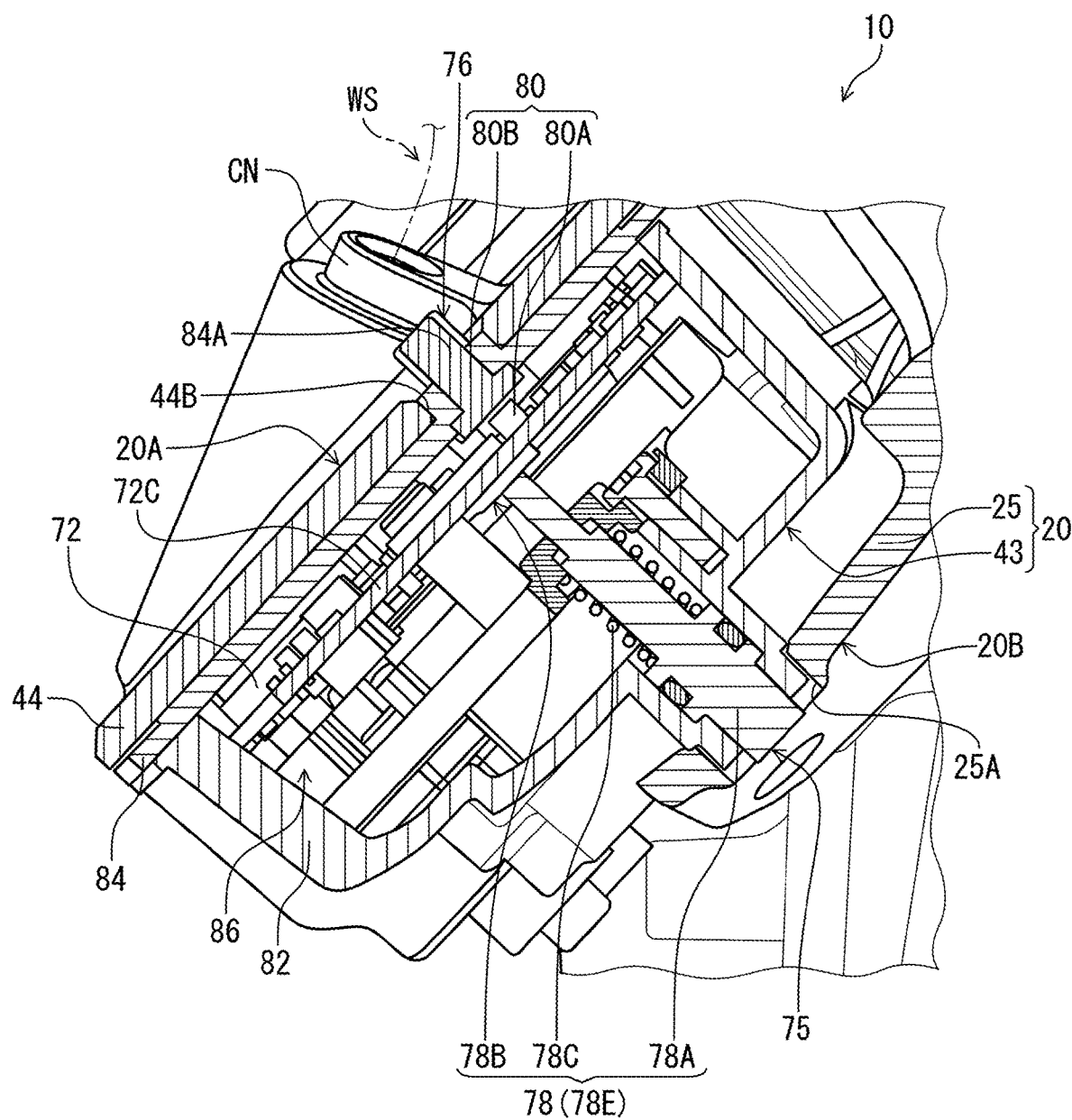
FIG. 10 is a cross-sectional view of the bicycle derailleur of the bicycle illustrated in FIG. 1.

As seen in FIG. 10, the base member 20 has a rear-sprocket facing surface 20A and a reverse surface 20B provided on a reverse side of the rear-sprocket facing surface 20A. The rear-sprocket facing surface 20A is configured to face toward the bicycle rear sprocket assembly RS (see, e.g., FIG. 1) in a mounting state where the base member 20 is attached to the bicycle frame 2A. In this embodiment, the rear-sprocket facing surface 20A is configured to face toward the axial center plane CP of the bicycle 2 in the mounting state where the base member 20 is attached to the bicycle frame 2A. The rear-sprocket facing surface 20A can also be referred to as a first base surface 20A. The reverse surface 20B can also be referred to as a second base surface 20B. Namely, the base member 20 includes the first base surface 20A and the second base surface 20B. The second base surface 20B is provided on a reverse side of the first base surface 20A. In this embodiment, the base body 25 includes the second base surface 20B. The cover 44 includes the first base surface 20A. However, the positions of the first base surface 20A and the second base surface 20B are not limited to this embodiment.

As seen in FIG. 2, the axial center plane CP of the bicycle 2 is defined at an axial center of the bicycle frame 2A in an axial direction D1 parallel to a sprocket rotational axis RA of the bicycle rear sprocket assembly RS. The axial center plane CP is perpendicular to the sprocket rotational axis RA of the bicycle rear sprocket assembly RS.

Figure 11:
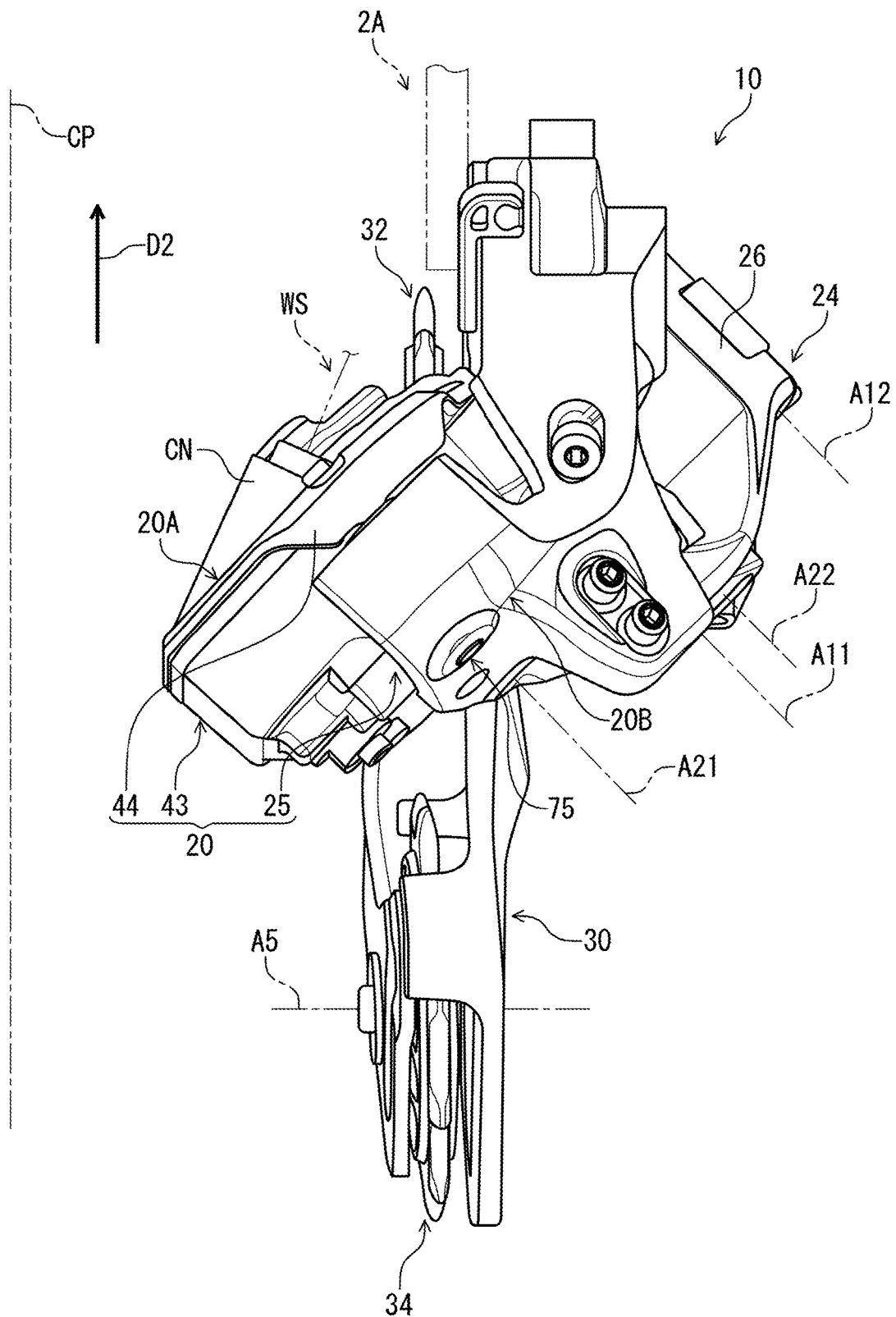
FIG. 11 is a rear view of the bicycle derailleur of the bicycle illustrated in FIG. 1.

As seen in FIG. 11, the first base surface 20A faces in an upper direction D2 in the mounting state where the base member 20 is attached to the bicycle frame 2A. The reverse surface 20B is inclined relative to the upper direction D2 in the mounting state where the base member 20 is attached to the bicycle frame 2A. The first base surface 20A is inclined relative to the upper direction D2 in the mounting state where the base member 20 is attached to the bicycle frame 2A. The upper direction D2 is parallel to the axial center plane CP of the bicycle 2. Thus, the first base surface 20A and the second base surface 20B are inclined relative to the upper direction D2 in the mounting state where the base member 20 is attached to the bicycle frame 2A.

In this embodiment, as seen in FIGS. 4, 5, and 10, the user interface 75 is provided in the reverse surface 20B. The user interface 75 is provided in the second base surface 20B. The information device 76 is provided in the rear-sprocket facing surface 20A. The information device 76 is provided on the first base surface 20A. However, the positions of the user interface 75 and the information device 76 are not limited to this embodiment.

As seen in FIG. 10, the base body 25 includes a hole 25A provided on the second base surface 20B. The switch 78 is at least partly provided in the hole 25A. The switch 78 includes a button 78A, a switch element 78B, and a switch biasing member 78C. The housing 43 includes a housing body 82 and a lid 84. The lid 84 is secured to the housing body 82 to define the internal space 86 between the housing body 82 and the lid 84. The housing body 82 includes a support hole 82A. The button 78A extends through the support hole 82A. The button 78A is movably supported by the housing 43 and is contactable with the switch element 78B. The switch element 78B constitutes a main part of the tactile switch and includes a mounting base, a movable contact, a fixed contact, and a film, for example. The switch biasing member 78C is configured to bias the button 78A toward a rest position. The button 78A is partly provided in the hole 25A of the base body 25 and is exposed from the second base surface 20B.

The light guide member 80B of the information device 76 is attached to the lid 84 of the housing 43. The lid 84 includes a support hole 84A. The cover 44 includes a hole 44B. The light guide member 80B of the indicator 80 extends through the support hole 84A and the hole 44B. The cover 44 is secured to the base body 25 to hold the housing body 82 and the lid 84 between the base body 25 and the cover 44.

As seen in FIG. 3, the user interface 75 is configured to receive the user input U3 to execute at least one of: (1) calibration in which the sensor SS1 is reset; (2) changing an assist operation of the assist driving unit DU; (3) changing information displayed in the display ED1; (4) the recovering operation by the actuator 38 of the bicycle derailleur 10; (5) a reset of the pairing operation between the bicycle derailleur 10 and another component; (6) changing the shifting threshold used in the automatic shifting mode; (7) changing the communication channel through which the bicycle derailleur 10 communicates with another component between the wired communication channel and the wireless communication channel; (8) changing a function assigned to the operating device 16 and/or 18 separately provided from the bicycle derailleur 10; (9) a shut-down of the system of the bicycle derailleur 10; (10) wake-up operation of the system of the bicycle derailleur 10; (11) a restart of the system of the bicycle derailleur 10; (12) operation of at least one additional bicycle component of a plurality of additional bicycle components; (13) changing the shifting mode between the automatic shifting mode and the manual shifting mode; and (14) changing the shifting mode between the synchronized shifting mode and the non-synchronized shifting mode.

In a case where the user interface 75 is configured to receive the user input U3 to execute the calibration of the sensor SS1, for example, the sensor SS1 is rest to execute zero adjustment of the sensor SS1 based on a current posture sensed by the sensor SS1 in response to the user input U3 received by the user interface 75 (e.g., the single click, the double click, or the long press of the switch 78).

In a case where the user interface 75 is configured to receive the user input U3 to execute the changing of the assist operation of the assist driving unit DU, for example, the assist mode of the assist driving unit DU is changed among at least two assist modes (e.g., the first assist mode and the second assist mode) in response to the user input U3 received by the user interface 75 (e.g., the single click, the double click, or the long press of the switch 78).

In a case where the user interface 75 is configured to receive the user input U3 to execute the changing of the information displayed in the display, for example, the electric device ED changes the information displayed on the display ED1 in response to the user input U3 received by the user interface 75 (e.g., the single click, the double click, or the long press of the switch 78).

In a case where the user interface 75 is configured to receive the user input U3 to execute the recovering operation of the saver structure 45, for example, the actuator 38 rotates the output member 46 in the opposite direction to bring the protrusion 50A in engagement with the notch 46A in response to the user input U3 received by the user interface 75 (e.g., the single click, the double click, or the long press of the switch 78).

In a case where the user interface 75 is configured to receive the user input U3 to execute the reset of the pairing operation between the bicycle derailleur 10 and another component (e.g., the operating devices 16 and 18), the controller 72 is configured to delete the first identifying information and the second identifying information from the memory 72M in response to the user input U3 received by the user interface 75 (e.g., the single click, the double click, or the long press of the switch 78).

In a case where the user interface 75 is configured to receive the user input U3 to execute the changing of the shifting threshold used in the automatic shifting mode, the controller 72 is configured to change the shifting threshold among the first shifting threshold, the second shifting threshold, and the third shifting threshold in response to the user input U3 received by the user interface 75 (e.g., the single click, the double click, or the long press of the switch 78).

In a case where the user interface 75 is configured to receive the user input U3 to execute the changing of the communication channel, the controller 72 is configured to delete the identifying information (e.g., the first identifying information and the second identifying information stored in the memory 72M) in response to the user input U3 received by the user interface 75 (e.g., the single click, the double click, or the long press of the switch 78).

In a case where the user interface 75 is configured to receive the user input U3 to execute the changing a function assigned to the operating device 16 and/or 18 separately provided from the bicycle derailleur 10, a function assigned to an interface of the operating device 16 and/or 18 is changed to another function in response to the user input U3 received by the user interface 75 (e.g., the single click, the double click, or the long press of the switch 78). For example, a function to receive the assist-mode input U13 is assigned to the assist mode switch SW13 in the operating device 16. However, the operating device 16 has a plurality of functions that can be assigned to the assist mode switch SW13. The operating device 16 is configured to change the function assigned to the assist mode switch SW13 to other functions in respond to the user input U3 received by the user interface 75.

In a case where the user interface 75 is configured to receive the user input U3 to execute the shut-down of the system of the bicycle derailleur 10, the controller 72 is configured to execute the shut-down (e.g., at least one of the normal shut-down and the forced shut-down) and is shut the power off in response to the user input U3 received by the user interface 75 (e.g., the single click, the double click, or the long press of the switch 78).

In a case where the user interface 75 is configured to receive the user input U3 to execute the wake-up of the bicycle derailleur 10 system, the controller 72 is configured to execute the wake-up operation to change the mode of the controller 72 from the sleep mode to the awake mode in response to the user input U3 received by the user interface 75 (e.g., the single click, the double click, or the long press of the switch 78).

In a case where the user interface 75 is configured to receive the user input U3 to execute the restart of the system of the bicycle derailleur 10, the controller 72 is configured to execute the normal shut-down and the start of the system of the bicycle derailleur 10 in response to the user input U3 received by the user interface 75 (e.g., the single click, the double click, or the long press of the switch 78).

In a case where the user interface 75 is configured to receive the user input U3 to execute the operation of at least one additional bicycle component of the plurality of additional bicycle components, the controller 72 is configured to transmit signals to the at least one additional bicycle component of the plurality of additional bicycle components in response to the user input U3 received by the user interface 75 (e.g., the single click, the double click, or the long press of the switch 78).

The plurality of additional bicycle components is separately provided from the bicycle derailleur 10 and has a structure and/or configuration different from a structure and/or configuration of the bicycle derailleur 10. For example, the at least one additional bicycle component of the plurality of additional bicycle components can include at least one of the bicycle suspension BS and the bicycle adjustable seatpost BA. The at least one additional bicycle component of the plurality of additional bicycle components can include the additional bicycle derailleur 12, the power supply PS, the assist driving unit DU, the operating device 16, the operating device 18, the electric device ED, or other devices.

In the where the additional bicycle component includes the bicycle suspension BS, the user interface 75 is configured to receive the user input U3 to execute changing the damper property and/or the stroke of the bicycle suspension BS. The suspension actuator of the bicycle suspension BS is configured to change the damper property of the bicycle suspension BS in response to the user input U3 received by the user interface 75. The suspension actuator of the bicycle suspension BS is configured to change the stroke of the bicycle suspension BS in response to the user input U3 received by the user interface 75. For example, the suspension actuator of the bicycle suspension BS is configured to change the damper property of the bicycle suspension BS in response to the single click of the switch 378. The suspension actuator of the bicycle suspension BS is configured to change the stroke of the bicycle suspension BS in response to the double click of the switch 378.

In a case where the additional bicycle component includes the bicycle adjustable seatpost BA, the user interface 75 is configured to receive the user input U3 to execute changing the state of the bicycle adjustable seatpost BA between the locked state and the adjustable state. For example, the seatpost actuator of the bicycle adjustable seatpost BA is configured to lengthen or shorten the bicycle adjustable seatpost BA in response to the user input U3 received by the user interface 75. For example, the seatpost actuator of the bicycle adjustable seatpost BA lengthens the bicycle adjustable seatpost BA in response to the double click of the switch 378 and shortens the bicycle adjustable seatpost BA in response to the single click of the switch 378.

In a case where the seatpost actuator of the bicycle adjustable seatpost BA is configured to move a valve rod of a hydraulic positioning structure of the bicycle adjustable seatpost BA, the seatpost actuator of the bicycle adjustable seatpost BA moves the valve rod from a locked position to an adjustable position for a predetermined period of time in response to the user input U3 of the user interface 75 (e.g., the single click, the double click, or the long press of the switch 78). The seatpost actuator of the bicycle adjustable seatpost BA moves the valve rod from the adjustable position to the locked position when the predetermined period of time elapses from the receipt of the user input U3 of the user interface 75 (e.g., the single click, the double click, or the long press of the switch 78).

In a case where the additional bicycle component includes the electric device ED, the user interface 75 is configured to receive the user input U3 to execute at least one of: (1) turning on or off the electric device ED; (2) changing the information displayed in the display ED1; and (3) start or stop of recording information relating to travel of the bicycle 2. For example, the electric device ED is configured to change the information displayed in the display ED1 in response to the single click of the switch 78. The electric device ED is configured to start or stop the recording of the information relating to travel of the bicycle 2 in response to the double click of the switch 78. The electric device ED is configured to turning on or off in response to the long press of the switch 78.

In a case where the additional bicycle component includes the lamp LP, the user interface 75 is configured to receive the user input U3 to execute at least one of: (1) turning on or off the lamp LP; (2) changing an illumination level of the lamp LP; and (3) changing an illumination pattern of the lamp LP. For example, the lamp LP is configured to change the illumination level of the lamp LP in response to the single click of the switch 78. The lamp LP is configured to change the illumination pattern of the lamp LP in response to the double click of the switch 78. The lamp LP is configured to turn on or off in response to the long press of the switch 78.

In a case where the additional bicycle component includes the assist driving unit DU, the user interface 75 is configured to receive the user input U3 to execute at least one of: (1) changing the assist mode of the assist driving unit DU; (2) turning on or off the assist driving unit DU; and (3) turning on or off a walk mode in which the assist ratio is set to a predetermined assist ratio regardless of the pedaling force. For example, the assist driving unit DU is configured to change the assist mode between the first and second assist modes in response to the single click of the switch 78. The assist driving unit DU is configured to turn on or off the walk mode in response to the double click of the switch 78. The assist driving unit DU is configured to turn on or off in response to the long press of the switch 78.

In a case where the user interface 75 is configured to receive the user input U3 to execute the changing of the shifting mode, the controller 72 is configured to change the shifting mode between the automatic shifting mode and the manual shifting mode in response to the user input U3 of the user interface 75 (e.g., the single click, the double click, or the long press of the switch 78).

In a case where the user interface 75 is configured to receive the user input U3 to execute the changing of the shifting mode, the controller 72 is configured to change the shifting mode between the synchronized shifting mode and the non-synchronized shifting mode in response to the user input U3 of the user interface 75 (e.g., the single click, the double click, or the long press of the switch 78).

Second Embodiment

A bicycle derailleur 210 in accordance with a second embodiment will be described below referring to FIG. 12. The bicycle derailleur 210 has the same structure and/or configuration as those of the bicycle derailleur 10 except for an inclination angle of the first to fourth linkage axes A11, A12, A21, and A22. Thus, elements having substantially the same function as those in the first embodiment will be numbered the same here and will not be described and/or illustrated again in detail here for the sake of brevity.

Figure 12:
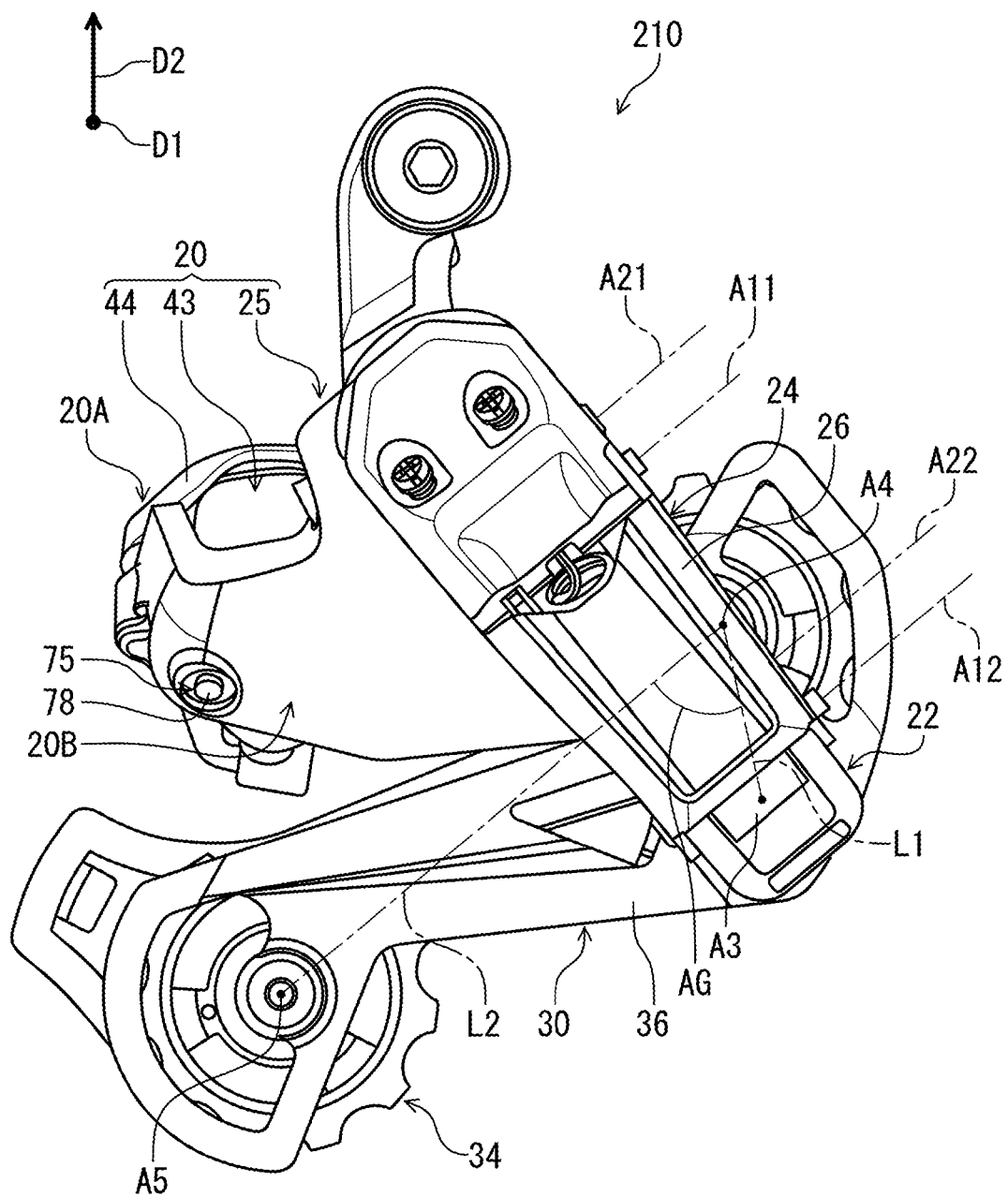
FIG. 12 is a side elevational view of a bicycle derailleur of in accordance with a second embodiment.

As seen in FIG. 12, the bicycle derailleur 210 comprises the base member 20, the movable member 22, and the linkage structure 24. The bicycle derailleur 210 comprises the chain guide 30. At least one of the user interface 75 and the information device 76 is mounted to at least one of the base member 20 and the linkage structure 24. The at least one of the user interface 75 and the information device 76 is mounted to at least one of the base member 20, the movable member 22, and the linkage structure 24.

In this embodiment, the pulley axis A4 and/or A5 extends along the axial direction D1 parallel to the sprocket rotational axis RA of the bicycle rear sprocket assembly RS in a mounting state where the bicycle derailleur 10 and the bicycle rear sprocket assembly RS are mounted to the bicycle frame 2A. At least one linkage axis A11, A12, A21, and/or A22 of the linkage structure 24 is oriented orthogonally to the axial direction D1. In this embodiment, the first to fourth linkage axes A11, A12, A21, and A22 of the linkage structure 24 are oriented orthogonally to the axial direction D1. As with the bicycle derailleur 10 of the first embodiment, however, the at least one linkage axis A11, A12, A21, and/or A22 of the linkage structure 24 can be inclined relative to the axial direction D1.

A first reference line L1 is defined to extend from the guide pulley axis A4 to the chain-guide axis A3. A second reference line L2 is defined to extend from the guide pulley axis A4 to the tension pulley axis A5. An angle AG defined by the first reference line L1 and the second reference line L2 ranges from 20 degrees to 170 degrees. In this embodiment, the angle AG ranges from 45 degrees to 120 degrees. The angle AG preferably ranges from 45 degrees to 100 degrees. The angle AG more preferably ranges from 60 degrees to 95 degrees. However, the angle AG is not limited to this embodiment and the above range.

Modifications

Figure 13:
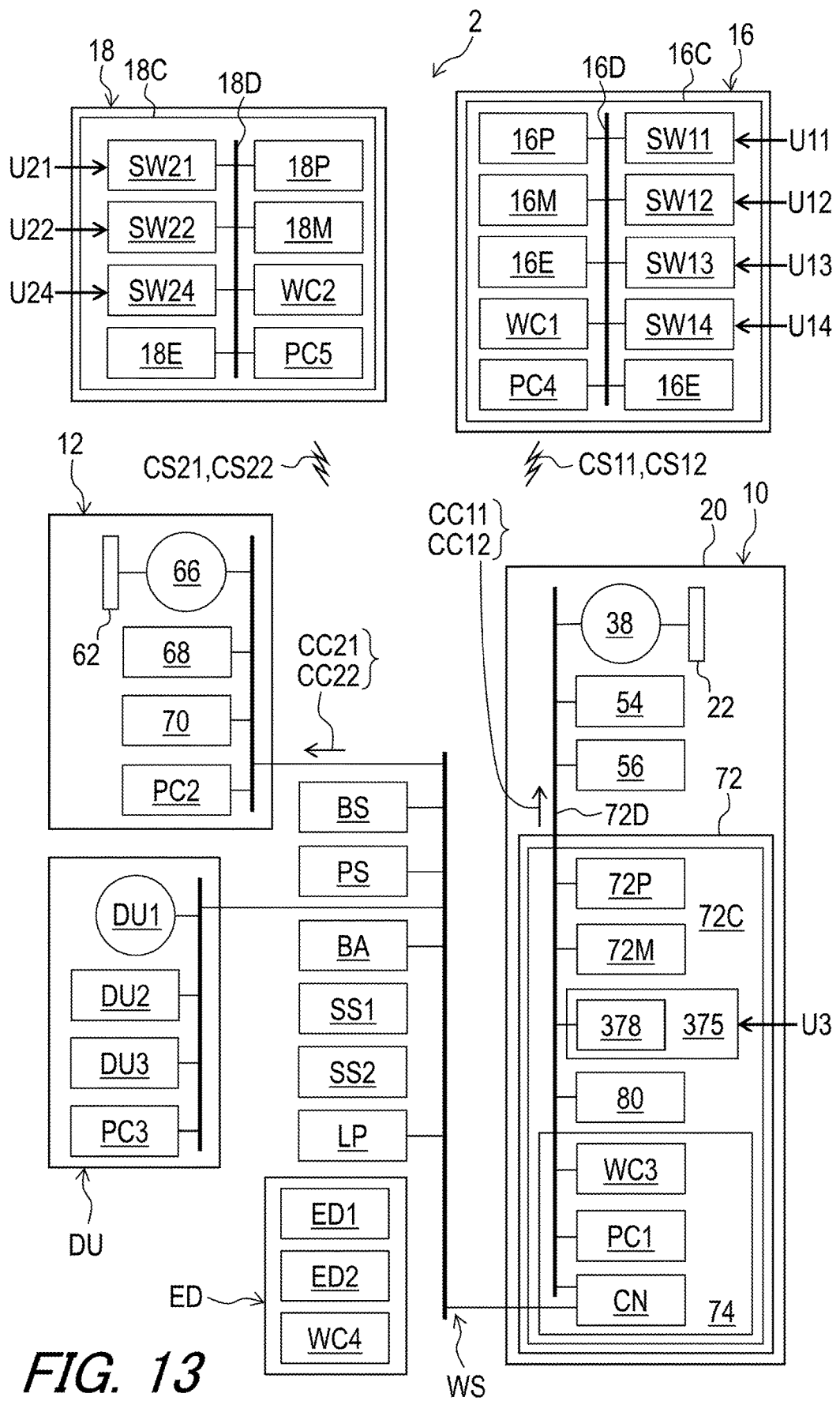
FIG. 13 is a schematic block diagram of the bicycle illustrated in FIG. 12 (wireless communication).

In the first and second embodiments, the switch 78 of the user interface 75 is a normally open switch. The switch 78 is configured not to keep an ON state of the switch 78 by itself. However, the structure of the user interface 75 is not limited to the switch 78 of the first and second embodiments. As seen in FIG. 13, the bicycle derailleur 10 comprises a user interface 375. The user interface 375 is configured to receive the user input U3 to execute at least one of: (1) calibration in which the sensor SS1 is reset; (2) changing an assist operation of the assist driving unit DU; (3) changing information displayed in the display ED1; (4) a recovering operation by the actuator 38 of the bicycle derailleur 10; (5) a reset of the pairing operation between the bicycle derailleur 10 and another component; (6) changing the shifting threshold used in the automatic shifting mode; (7) changing the communication channel through which the bicycle derailleur 10 communicates with another component between the wired communication channel and the wireless communication channel; (8) changing a function assigned to the operating device 16 and/or 18 separately provided from the bicycle derailleur 10; (9) a shut-down of the system of the bicycle derailleur 10; (10) wake-up of the system of the bicycle derailleur 10; (11) a restart of the system of the bicycle derailleur 10; (12) operation of at least one additional bicycle component of a plurality of additional bicycle components; (13) changing the shifting mode between the automatic shifting mode and the manual shifting mode; and (14) changing the shifting mode between the synchronized shifting mode and the non-synchronized shifting mode.

Figure 14:
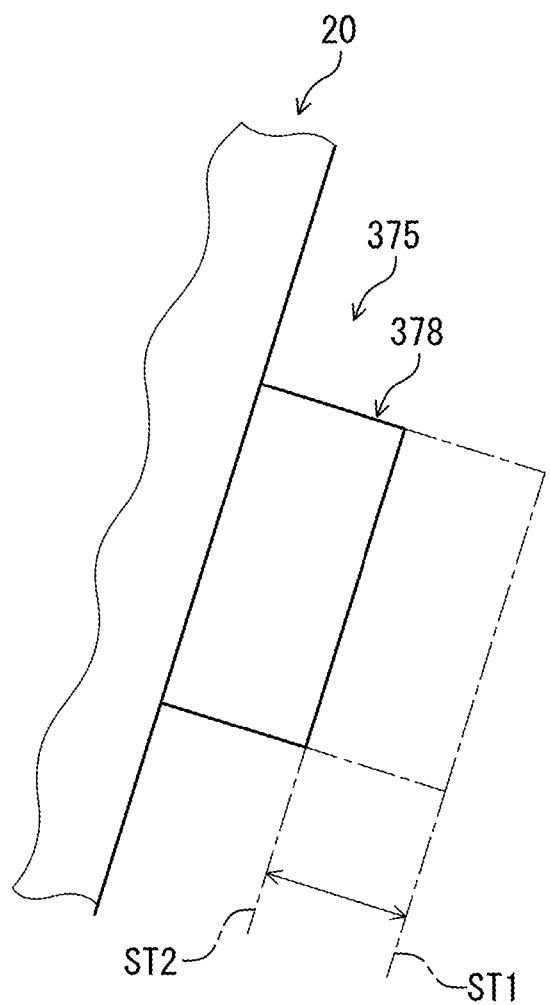
FIG. 14 is a user interface of the bicycle derailleur in accordance with a modification.

In this modification, as seen in FIG. 14, the user interface 375 include a switch 378 having a first switch status ST1 and a second switch status ST2 that is different from the first switch status ST1. For example, the first switch status ST1 corresponds to an OFF state of an electrical contact of the switch 378. The second switch status ST2 corresponds to an ON state of the electrical contact of the switch 378. The switch 378 has a structure configured to maintain each of the first switch status ST1 (e.g., the OFF state) and the second switch status ST2 (e.g., the ON state) by itself. The switch 378 is configured to change the state of the switch 378 between the first switch status ST1 and the second switch status ST2 in response to the user's operation.

The bicycle derailleur 10 has a first derailleur status and a second derailleur status that is different from the first derailleur status. The bicycle derailleur 10 is in the first derailleur status while the switch 378 is in the first switch status ST1. The bicycle derailleur 10 is in the second derailleur status while the switch 378 is in the second switch status ST2. In this embodiment, the first switch status ST1 corresponds to the wireless communication channel through which the wireless communicator WC3 wirelessly communicates with the operating devices 16 and 18. The second switch status ST2 corresponds to the wired communication channel through which the wired communicator PC1 communicates with the operating devices 16 and 18 via the wired communication structure WS. The communication channel can be changed between the wired communication channel and the wireless communication channel in response to the operation of the switch 378. The first switch status ST1 and the second switch status ST2 are not limited to the wireless communication channel and the wired communication channel.

Furthermore, the user interface 375 can be configured to receive the user input U3 to execute the operation of the at least one additional bicycle component of the plurality of additional bicycle components. The at least one additional bicycle component of the plurality of additional bicycle components has a first component status and a second component status that is different from the first component status. The at least one additional bicycle component of the plurality of additional bicycle components is in the first component status while the switch 378 is in the first switch status ST1. The at least one additional bicycle component of the plurality of additional bicycle components is in the second component status while the switch 378 is in the second switch status ST2.

For example, in a case where the additional bicycle component includes the assist driving unit DU, the first switch status ST1 and the first component status correspond to the first assist mode of the assist driving unit DU, and the second switch status ST2 and the second component status correspond to the second assist mode of the assist driving unit DU. The assist mode of the assist driving unit DU can be changed between the first assist mode and the second assist mode in response to the operation of the switch 378. The first switch status ST1 and the first component status are not limited to the first assist mode of the assist driving unit DU. The second switch status ST2 and the second component status are not limited to the second assist mode of the assist driving unit DU.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
   a base member configured to be attached to a bicycle frame;
   a movable member configured to be movable relative to the base member;
   a linkage structure configured to movably couple the movable member to the base member;
   a user interface configured to receive a user input to execute at least one of:
     calibration in which a sensor is reset;
     changing an assist operation of an assist driving unit;
     changing information displayed in a display;
     a recovering operation by an actuator of the bicycle derailleur;
     a reset of a pairing operation between the bicycle derailleur and another component;
     changing a shifting threshold used in an automatic shifting mode;
     changing a communication channel through which the bicycle derailleur communicates with another component between a wired communication channel and a wireless communication channel;
     changing a function assigned to an operating device separately provided from the bicycle derailleur;
     a shut-down of a system of the bicycle derailleur;
     a wake-up operation of the system of the bicycle derailleur;
     a restart of the system of the bicycle derailleur;
     an operation of at least one additional bicycle component of a plurality of additional bicycle components;
     changing a shifting mode between the automatic shifting mode and a manual shifting mode; and
     changing the shifting operation between a synchronized shifting mode and a non-synchronized shifting mode.

2. The bicycle derailleur according to claim 1, wherein the user interface includes a switch other than a push switch.

3. The bicycle derailleur according to claim 1, wherein the user interface includes a switch having a first switch status and a second switch status that is different from the first switch status,
   the bicycle derailleur has a first derailleur status and a second derailleur status that is different from the first derailleur status,
   the bicycle derailleur is in the first derailleur status while the switch is in the first switch status, and
   the bicycle derailleur is in the second derailleur status while the switch is in the second switch status.

4. The bicycle derailleur according to claim 1, wherein the user interface includes a switch having a first switch status and a second switch status that is different from the first switch status,
   the at least one additional bicycle component of the plurality of additional bicycle components has a first component status and a second component status that is different from the first component status,
   the at least one additional bicycle component of the plurality of additional bicycle components is in the first component status while the switch is in the first switch status, and the at least one additional bicycle component of the plurality of additional bicycle components is in the second component status while the switch is in the second switch status.

5. The bicycle derailleur according to claim 1, wherein the user interface includes at least one of a dial switch, a tactile switch, a slide switch, a capacitive switch, and a toggle switch.

6. The bicycle derailleur according to claim 1, wherein the base member has a rear-sprocket facing surface and a reverse surface provided on a reverse side of the rear-sprocket facing side,
the rear-sprocket facing side is configured to face toward a bicycle rear sprocket assembly in a mounting state where the base member is attached to the bicycle frame, and
the user interface is provided in the reverse surface.

7. The bicycle derailleur according to claim 6, wherein the reverse surface is inclined relative to an upper direction in the mounting state where the base member is attached to the bicycle frame.

8. The bicycle derailleur according to claim 1, further comprising
an information device configured to inform a user of a state of the bicycle derailleur.

9. The bicycle derailleur according to claim 8, wherein the information device is mounted to at least one of the base member, the movable member, and the linkage structure.

10. The bicycle derailleur according to claim 8, wherein the base member has a rear-sprocket facing surface and a reverse surface provided on a reverse side of the rear-sprocket facing side,
the rear-sprocket facing side is configured to face toward a bicycle rear sprocket assembly in a mounting state where the base member is attached to the bicycle frame, and
the information device is provided in the rear-sprocket facing surface.

11. The bicycle derailleur according to claim 8, wherein the information device includes an indicator configured to indicate the state of the bicycle derailleur.

12. The bicycle derailleur according to claim 11, wherein the indicator includes a light emitter configured to emit light in accordance with the state of the bicycle derailleur.

13. The bicycle derailleur according to claim 8, wherein the information device is configured to inform the user of a state of a battery charge.

14. The bicycle derailleur according to claim 1, wherein the at least one additional bicycle component of the plurality of additional bicycle components includes at least one of a bicycle suspension and a bicycle adjustable seatpost.

15. A bicycle derailleur comprising:
a base member configured to be attached to a bicycle frame;
a movable member configured to be movable relative to the base member;
a linkage structure configured to movably couple the movable member to the base member; and
a user interface including an electric switch other than a push switch.

16. A bicycle derailleur comprising:
a base member configured to be attached to a bicycle frame, the base member including a first base surface and a second base surface, the first base surface facing in an upper direction in the mounting state where the base member is attached to the bicycle frame, the second base surface being provided on a reverse side of the first base surface;
a movable member configured to be movable relative to the base member;
a linkage structure configured to movably couple the movable member to the base member; and
a user interface configured to receive a user input and provided in the second base surface.

* * * * *